US011376933B2

(12) United States Patent
Yoshikawa et al.

(10) Patent No.: US 11,376,933 B2
(45) Date of Patent: Jul. 5, 2022

(54) SUNROOF PANEL FOR VEHICLE

(71) Applicant: AISIN CORPORATION, Kariya (JP)

(72) Inventors: Hirotaka Yoshikawa, Kariya (JP); Makoto Muranaka, Kariya (JP); Tatsuya Matsui, Kariya (JP); Satoshi Kono, Kariya (JP)

(73) Assignee: Aisin Corporation, Kariya (JP)

( * ) Notice: Subject to any disclaimer, the term of this patent is extended or adjusted under 35 U.S.C. 154(b) by 83 days.

(21) Appl. No.: 16/791,577

(22) Filed: Feb. 14, 2020

(65) Prior Publication Data
US 2020/0262277 A1 Aug. 20, 2020

(30) Foreign Application Priority Data

Feb. 18, 2019 (JP) .............................. JP2019-026615
Sep. 18, 2019 (JP) .............................. JP2019-169679

(51) Int. Cl.
*B60J 7/043* (2006.01)
*B60J 10/15* (2016.01)
(Continued)

(52) U.S. Cl.
CPC .............. *B60J 7/043* (2013.01); *B60J 10/90* (2016.02); *B60J 10/15* (2016.02); *B60J 10/16* (2016.02); *B60J 10/23* (2016.02)

(58) Field of Classification Search
CPC ... B60J 7/043; B60J 10/00; B60J 10/15; B60J 10/16; B60J 10/23; B60J 10/45; B60J 10/90
(Continued)

(56) References Cited

U.S. PATENT DOCUMENTS 7,798,565 B2 * 9/2010 Johl ........................ B62D 65/14
296/210
2019/0299760 A1 * 10/2019 Fukada ................... B62D 25/06
2020/0109783 A1 * 4/2020 Staltmayer ............. F16J 15/022

FOREIGN PATENT DOCUMENTS

CN 105774496 A * 7/2016
DE 10 2017 106 751 B3 5/2018
(Continued)

OTHER PUBLICATIONS

Weisen, "Drainage Mechanism Of Vehicle Sunroof", Jul. 20, 2016, Chinese Patent Office, CN105774496A (Year: 2016).*
(Continued)

*Primary Examiner* — Dennis H Pedder
*Assistant Examiner* — Joyce Eileen Hill
(74) *Attorney, Agent, or Firm* — Finnegan, Henderson, Farabow, Garrett & Dunner, LLP

(57) ABSTRACT

A sunroof panel for a vehicle includes a mounting surface at which a first roof element is mounted, a first frame including a first plate that includes a first mounting surface, the first frame including a first stepped plate that extends from a longitudinal end portion of the first plate to generate a step relative to the first plate, a second frame including a second plate that includes a second mounting surface, a joining portion joining the first frame and the second frame in a state where the first stepped plate and an end portion of the second plate overlap each other to cause the first mounting surface and the second mounting surface to be coplanar with each other, and a film attached to the first mounting surface and the second mounting surface to cover a gap formed between the first plate and the second plate.

4 Claims, 16 Drawing Sheets

(51) Int. Cl.
  *B60J 10/16* (2016.01)
  *B60J 10/23* (2016.01)
  *B60J 10/90* (2016.01)

(58) Field of Classification Search
  USPC ..... 296/216.01, 216.06, 216.07, 216.08, 215
  See application file for complete search history.

(56) References Cited

FOREIGN PATENT DOCUMENTS

FR        2780905  A1 *  1/2000  ............. B62D 65/06
JP        H10202150 A *  8/1998  ............... B05B 1/02

OTHER PUBLICATIONS

Laurent, "Automobile opening panel manufacturing process using frame, template and finishing panel", Jan. 14, 2000, French Patent Office, FR2780905A1 (Year: 2000).*
Hisami, "Nozzle for Coating", Aug. 4, 1998, Japan Patent Office, Edition JPH10202150A (Year: 1998).*
U.S. Appl. No. 16/784,771, filed Feb. 7, 2020.

* cited by examiner

SUNROOF PANEL FOR VEHICLE

CROSS REFERENCE TO RELATED APPLICATIONS

This application is based on and claims priority under 35 U.S.C. § 119 to Japanese Patent Application 2019-026615, filed on Feb. 18, 2019, and Japanese Patent Application 2019-169679, filed on Sep. 18, 2019, the entire contents of which are incorporated herein by reference.

TECHNICAL FIELD

This disclosure generally relates to a sunroof panel for a vehicle.

BACKGROUND DISCUSSION

A vehicle including a sunroof panel mounted at a roof of the vehicle and a center panel opening and closing an opening portion formed at the sunroof panel is disclosed, for example, in DE102017106751B3, for example. The sunroof panel is constituted by plural frames (for example, two frames) that are individually formed and are joined in a state where end portions thereof overlap each other. One of the frames joined to each other is linearly formed and the other of the frames includes a bent portion so as to generate a step.

In a case where end portions of the two frames are joined to each other, a gap may be generated at a joint portion between the two frames. When a weather strip serving as an example of a roof element is mounted at the two frames while spreading over the gap, a sealing ability of the weather strip decreases because the two frames and the weather strip have difficulty in tightly contacting each other. In the aforementioned sunroof panel, the gap generated upon joining the end portions of the two frames is filled with a seal member including hardening ability so that the sealing ability of the weather strip is restrained from decreasing.

The aforementioned circumstances may also occur in a case where the other roof element than the weather strip is mounted at the sunroof panel.

A need thus exists for a sunroof panel for a vehicle which is not susceptible to the drawback mentioned above.

SUMMARY

According to an aspect of this disclosure, a sunroof panel for a vehicle includes a mounting surface at which a first roof element constituting a roof for a vehicle is mounted, a first frame including a first plate that includes a first mounting surface constituting a part of the mounting surface, the first frame including a first stepped plate that extends from a longitudinal end portion of the first plate to generate a step relative to the first plate, a second frame including a second plate that includes a second mounting surface constituting a part of the mounting surface, a joining portion joining the first frame and the second frame in a state where the first stepped plate and an end portion of the second plate overlap each other to cause the first mounting surface and the second mounting surface to be coplanar with each other, and a film attached to the first mounting surface and the second mounting surface to cover a gap formed between the first plate and the second plate, the gap separating the first mounting surface and the second mounting surface from each other.

According to another aspect of the disclosure, a sunroof panel for a vehicle includes a mounting surface at which a roof element constituting a roof for a vehicle is mounted, a first frame and a second frame extending along the mounting surface, a joining portion joining the first frame and the second frame in a state where end portions of the first frame and the second frame overlap each other, and a resin layer covering at least a part of the first frame and at least a part of the second frame. The resin layer includes the mounting surface that extends in a longitudinal direction of the first frame and the second frame while spreading over a joint portion between the first frame and the second frame.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
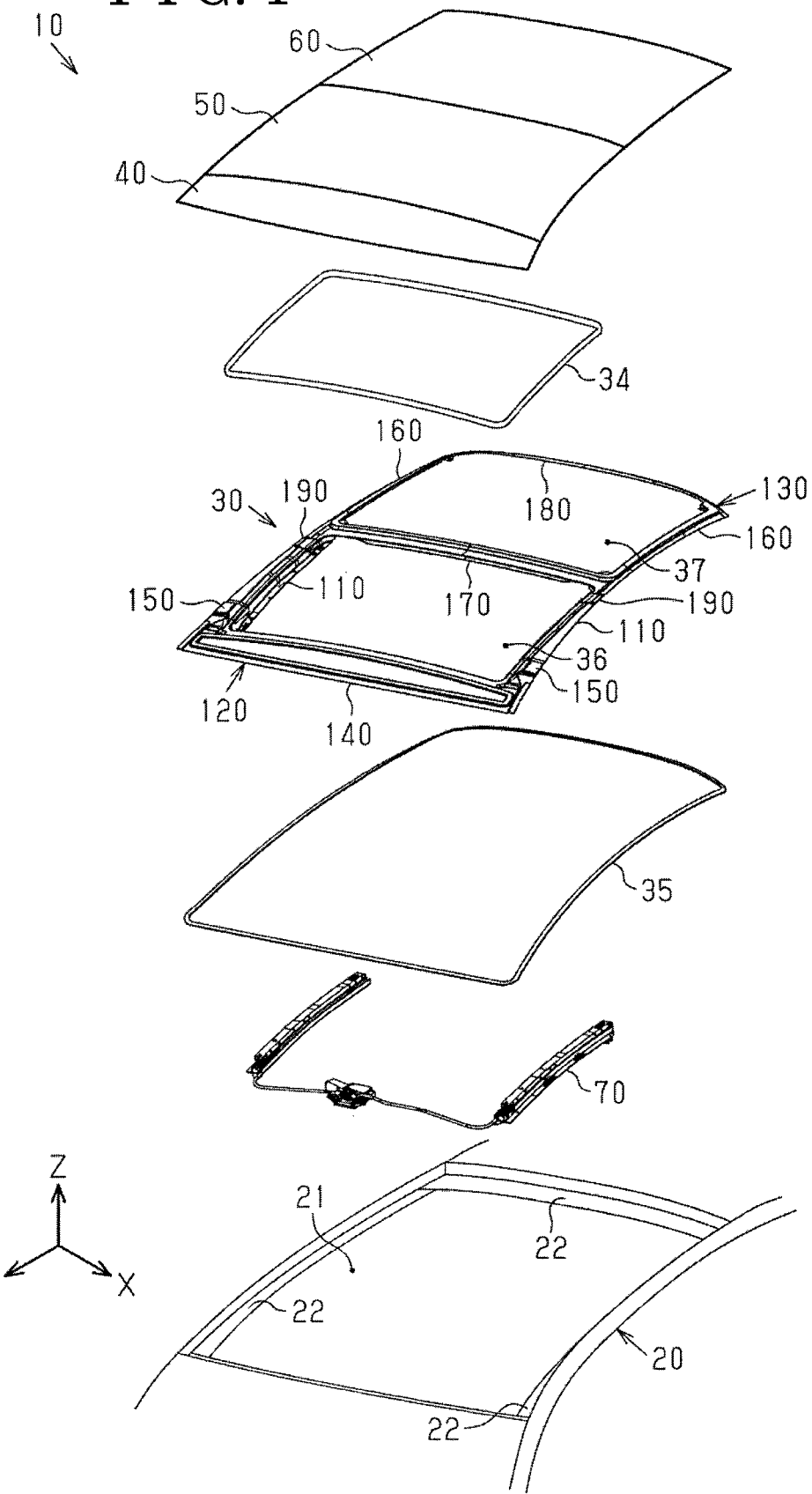
FIG. 1 is an exploded perspective view of a vehicle including a sunroof panel according to a first embodiment.

A sunroof panel for a vehicle (which is hereinafter also referred to as a sunroof panel) according to a first embodiment is explained with reference to the attached drawings. As illustrated in FIG. 1, a vehicle 10 includes a vehicle body 20 at which an opening portion 21 in a substantially rectangular shape is provided, a sunroof panel 30, a front panel 40, a center panel 50, a rear panel 60, and a sunroof device 70. The sunroof panel 30 is configured to be mounted at the opening portion 21 of the vehicle body 20. The front panel 40, the center panel 50, and the rear panel 60 are arranged side by side in a vehicle front-rear direction. The sunroof device 70 drives the center panel 50. In the following explanation, a vehicle width direction, the vehicle front-rear direction, and a vehicle up-down direction correspond to directions where an axis X, an axis Y, and an axis X extend in each drawing.

Figure 2:
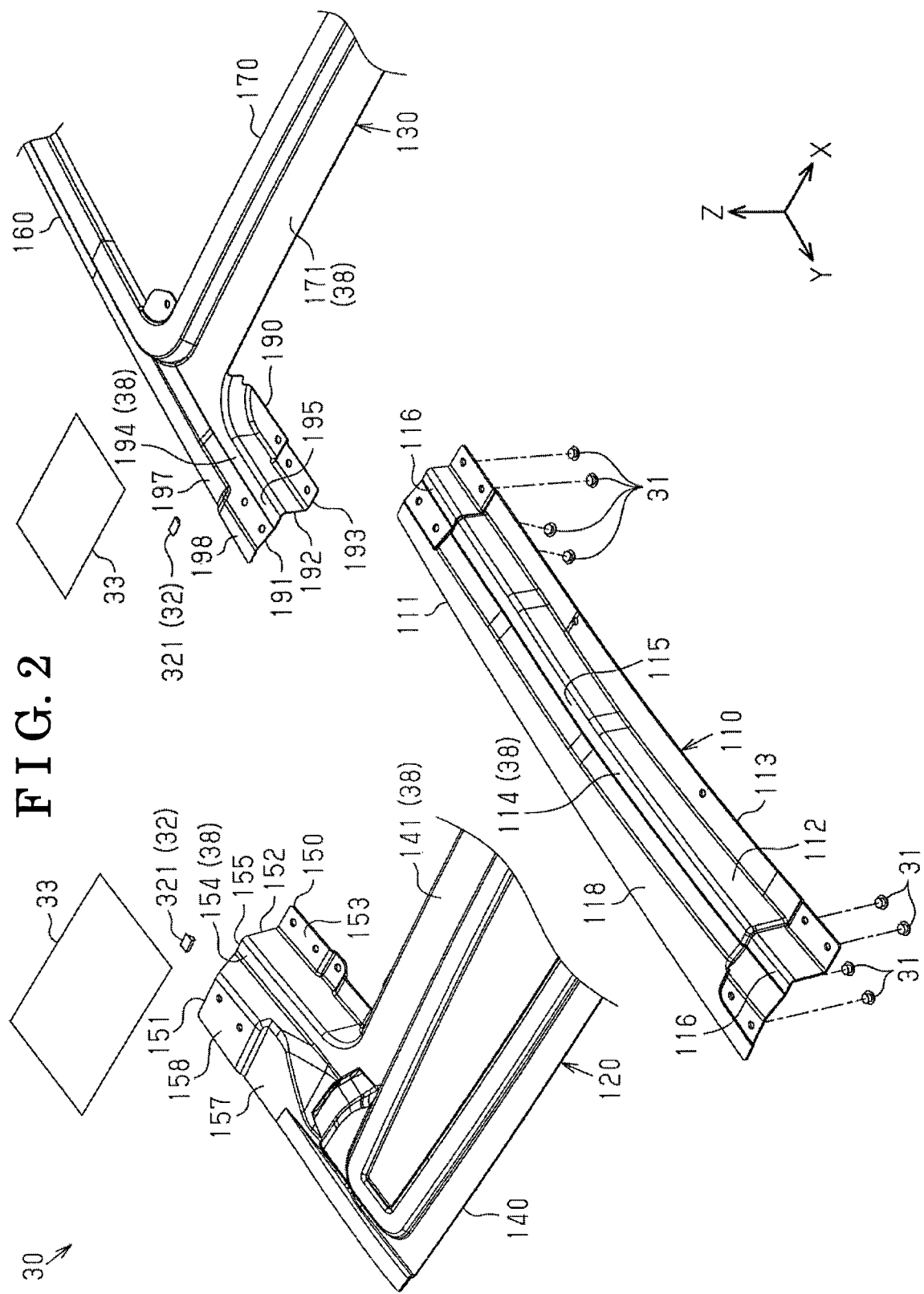
FIG. 2 is an exploded perspective view of the sunroof panel as viewed from an upper side of the vehicle.
Figure 3:
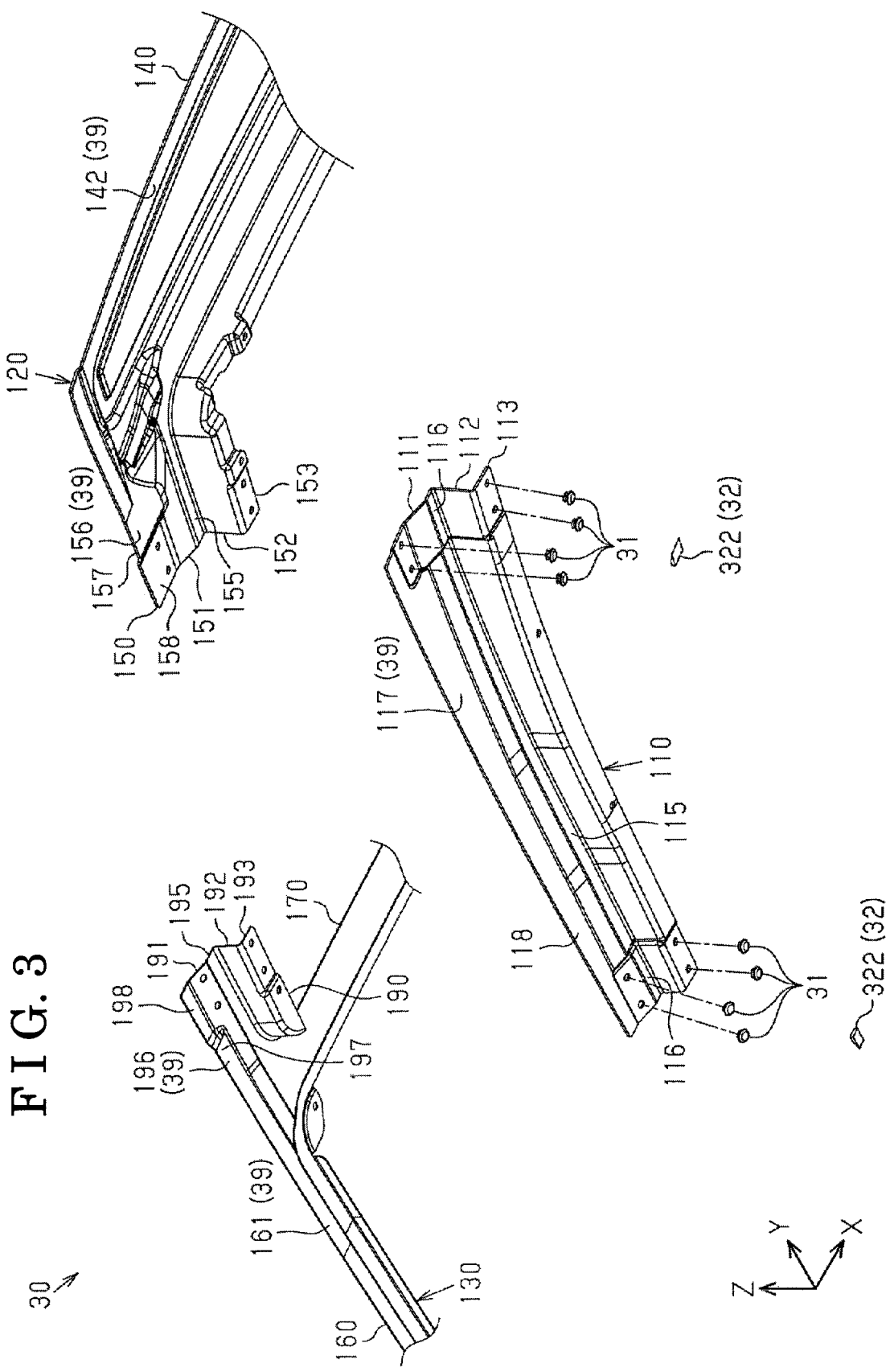
FIG. 3 is an exploded perspective view of the sunroof panel as viewed from a lower side of the vehicle.

The vehicle body 20 includes a mounting portion 22 at which the sunroof panel 30 is mounted. The mounting portion 22 including a frame form in a plan view is provided along a peripheral edge of the opening portion 21. As illustrated in FIG. 1, the sunroof panel 30 includes opposed side frames 110, a front frame unit 120, and a rear frame unit 130. The side frames 110 constitute lateral portions of the sunroof panel 30 opposed in the vehicle width direction. The front frame unit 120 constitutes a front portion of the sunroof panel 30. The rear frame unit 130 constitutes a rear portion of the sunroof panel 30. As illustrated in FIGS. 2 and 3, the sunroof panel 30 includes joining portions 31, fillers 32, and films 33. The joining portions 31 join and connect the side frames 110, the front frame unit 120, and the rear frame unit 130. The fillers 32 are arranged at respective joint portions where the side frames 110, the front frame unit 120, and the rear frame unit 130 are joined to each other. The films 33 are attached to the aforementioned joint portions. The sunroof panel 30 further includes a weather strip 34 and a seal 35 as illustrated in FIG. 1 for restraining raindrops, for example, from entering an interior of the vehicle 10.

The sunroof panel 30 according to the first embodiment is a separate-type base panel constituted by plural frames, for example, which are individually formed and are connected to each other. As illustrated in FIG. 1, the sunroof panel 30 includes a first opening portion 36 configured to be covered by the center panel 50 and a second opening portion 37 configured to be covered by the rear panel 60. As illustrated in FIGS. 2 and 3, the sunroof panel 30 also includes an inner mounting surface 38 to which the weather strip 34 is mounted and an outer mounting surface 39 to which the seal 35 is mounted. Each of the inner mounting surface 38 and the outer mounting surface 39 is provided to spread or span over the side frames 110, the front frame unit 120, and the rear frame unit 130.

As illustrated in FIG. 1, the side frames 110 arranged at opposed sides in the vehicle width direction extend in the vehicle front-rear direction. Each side frame 110 includes a substantially constant cross-section in a longitudinal direction. The side frame 110 is formed from a pressed metal sheet, for example.

As illustrated in FIGS. 2 and 3, each side frame 110 includes a first wall portion 111, a second wall portion 112, and a third wall portion 113. The first wall portion 111 is positioned next to the second wall portion 112 in the vehicle width direction. The second wall portion 112 extends downward in the vehicle from an inner edge of the first wall portion 111. The third wall portion 113 extends inward in the vehicle from a lower edge of the second wall portion 112.

The first wall portion 111 of the side frame 110 includes a first inner plate 115, first inner stepped plates 116, and a first outer plate 118. The first inner plate 115 includes a first inner mounting surface 114 constituting a part of the inner mounting surface 38. The first inner stepped plates 116 extend from opposed longitudinal ends of the first inner plate 115. The first outer plate 118 includes a first outer mounting surface 117 constituting a part of the outer mounting surface 39.

The first outer plate 118 is arranged adjacent to the first inner plate 115 and the first inner stepped plates 116 in the vehicle width direction. The first inner plate 115 includes the first inner mounting surface 114 that extends in the vehicle front-rear direction along an inner edge of the first inner plate 115 in the vehicle width direction. The first outer plate 118 includes the first outer mounting surface 117 that extends in the vehicle front-rear direction along an outer edge of the first outer plate 118 in the vehicle width direction. The first inner mounting surface 114 faces upward and the first outer mounting surface 117 faces downward in the vehicle. Each first inner stepped plate 116 includes a base portion that is connected to the first inner plate 115 and is bent so that a step is generated relative to the first inner plate 115. The first inner stepped plate 116 is positioned lower than the first inner plate 115 in the vehicle.

In the embodiment, the side frame 110 serves as an example of a first frame. The first inner mounting surface 114 serves as an example of a first mounting surface. The first inner plate 115 serves as an example of a first plate. The first inner stepped plate 116 serves as a first stepped plate.

As illustrated in FIG. 1, the front frame unit 120 includes a front frame 140 extending in the vehicle width direction and first connection frames 150. The first connection frames 150 extend rearward in the vehicle from opposed ends of the front frame 140 opposed in the vehicle width direction. The front frame 140 and the first connection frames 150 are integrally formed from a pressed metal sheet, for example.

As illustrated in FIGS. 2 and 3, the front frame 140 is formed in a substantially rectangular plate form including a long side in the vehicle width direction and a short side in the vehicle front-rear direction. The front frame 140 is curved so that a center in the vehicle width direction is positioned upper than the opposed ends as viewed from a front side in the vehicle.

As illustrated in FIGS. 2 and 3, the front frame 140 includes a third inner mounting surface 141 constituting a part of the inner mounting surface 38 and a third outer mounting surface 142 constituting a part of the outer mounting surface 39. The third inner mounting surface 141 extends in the vehicle width direction along a rear edge of the front frame 140. The third outer mounting surface 142 extends in the vehicle width direction along a front edge of the front frame 140. The third inner mounting surface 141 faces upward and the third outer mounting surface 142 faces downward in the vehicle.

Each first connection frame 150 includes a cross-section substantially the same as that of a front end portion of each side frame 110. The first connection frame 150 includes a first wall portion 151, a second wall portion 152, and a third wall portion 153. The first wall portion 151 is positioned next to the second wall portion 152 in the vehicle width direction. The second wall portion 152 extends downward in the vehicle from an inner edge of the first wall portion 151.

The third wall portion 153 extends inward in the vehicle from a lower edge of the second wall portion 152.

The first wall portion 151 of the first connection frame 150 includes a second inner plate 155, a second outer plate 157, and a second outer stepped plate 158. The second inner plate 155 includes a second inner mounting surface 154 constituting a part of the inner mounting surface 38. The second outer plate 157 includes a second outer mounting surface 156 constituting a part of the outer mounting surface 39. The second outer stepped plate 158 extends rearward from a rear end of the second outer plate 157 in a longitudinal direction thereof.

The second outer plate 157 and the second outer stepped plate 158 are arranged adjacent to the second inner plate 155 in the vehicle width direction. The second inner plate 155 includes the second inner mounting surface 154 that extends in the vehicle front-rear direction along an inner edge of the second inner plate 155 in the vehicle width direction. The second outer plate 157 includes the second outer mounting surface 156 that extends in the vehicle front-rear direction along an outer edge of the second outer plate 157 in the vehicle width direction. The second inner mounting surface 154 faces upward and the second outer mounting surface 156 faces downward in the vehicle. The second outer stepped plate 158 includes a base portion that is connected to the second outer plate 157 and is bent so that a step is generated relative to the second outer plate 157. The second outer stepped plate 158 is positioned upper than the second outer plate 157 in the vehicle.

In the embodiment, the first connection frame 150 serves as an example of a second frame. The second inner mounting surface 154 serves as an example of a second mounting surface. The second inner plate 155 serves as an example of a second plate.

As illustrated in FIG. 1, the rear frame unit 130 includes rear side frames 160, a center frame 170, and a rear frame 180. The rear side frames 160 arranged at opposed sides in the vehicle width direction extend in the vehicle front-rear direction. The center frame 170 connects between front end portions of the respective rear side frames 160. The rear frame 180 connects between rear end portions of the respective rear side frames 160. The rear frame unit 130 further includes second connection frames 190 arranged at opposed sides in the vehicle width direction to extend forward in the vehicle. The rear frame unit 130 is integrally formed from a pressed metal sheet, for example. The second opening portion 37 in the rear frame unit 130 is defined by the rear side frames 160, the center frame 170, and the rear frame 180.

As illustrated in FIGS. 2 and 3, each rear side frame 160 includes a long side in the vehicle front-rear direction. The center frame 170 includes a long side in the vehicle width direction. The rear frame 180 includes a long side in the vehicle width direction.

As illustrated in FIG. 2, the center frame 170 includes a fourth inner mounting surface 171 constituting a part of the inner mounting surface 38. The fourth inner mounting surface 171 extends in the vehicle width direction along a front edge of the center frame 170. The fourth inner mounting surface 171 faces upward in the vehicle. As illustrated in FIG. 3, the rear side frame 160 includes a fourth outer mounting surface 161 constituting a part of the outer mounting surface 39. The rear frame 180 also includes a fourth outer mounting surface constituting a part of the outer mounting surface 39. The fourth outer mounting surface 161 extends in the vehicle front-rear direction along an outer edge of the rear side frame 160 in the vehicle width direction. The fourth outer mounting surface of the rear frame 180 extends in the vehicle width direction along a rear edge of the rear frame 180. The fourth outer mounting surface 161 of the rear side frame 160 and the fourth outer mounting surface of the rear frame 180 face downward in the vehicle.

As illustrated in FIGS. 2 and 3, each second connection frame 190 includes a cross-section substantially the same as that of a rear end portion of each side frame 110. The second connection frame 190 includes a first wall portion 191, a second wall portion 192, and a third wall portion 193. The first wall portion 191 is positioned next to the second wall portion 192 in the vehicle width direction. The second wall portion 192 extends downward in the vehicle from an inner edge of the first wall portion 191. The third wall portion 193 extends inward in the vehicle from a lower edge of the second wall portion 192.

The first wall portion 191 of the second connection frame 190 includes a second inner plate 195, a second outer plate 197, and a second outer stepped plate 198. The second inner plate 195 includes a second inner mounting surface 194 constituting a part of the inner mounting surface 38. The second outer plate 197 includes a second outer mounting surface 196 constituting a part of the outer mounting surface 39. The second outer stepped plate 198 extends forward from a front end of the second outer plate 197 in a longitudinal direction thereof.

The second outer plate 197 and the second outer stepped plate 198 are arranged adjacent to the second inner plate 195 in the vehicle width direction. As illustrated in FIG. 2, the second inner plate 195 includes the second inner mounting surface 194 that extends in the vehicle front-rear direction along an inner edge of the second inner plate 195 in the vehicle width direction. As illustrated in FIG. 3, the second outer plate 197 includes the second outer mounting surface 196 that extends in the vehicle front-rear direction along an outer edge of the second outer plate 197 in the vehicle width direction. The second inner mounting surface 194 faces upward and the second outer mounting surface 196 faces downward in the vehicle. The second outer stepped plate 198 includes a base portion that is connected to the second outer plate 197 and is bent so that a step is generated relative to the second outer plate 197. The second outer stepped plate 198 is positioned upper than the second outer plate 197 in the vehicle.

As illustrated in FIGS. 2 and 3, the joining portions 31 join and connect the front frame unit 120 and the side frames 110 and join and connect the rear frame unit 130 and the side frames 110. Each joining portion 31 may be constituted by a fastening member such as a bolt and a rivet, for example, or may be a portion that is welded.

As illustrated in FIGS. 2 and 3, the fillers 32 are arranged at gaps formed at connection portions between the front frame unit 120 and the side frames 110 and between the rear frame unit 130 and the side frames 110. Each filler 32 is desirably solid at normal temperature and includes elasticity and high water resistance, for example. The filler 32 is desirably made of elastomer such as resin and rubber, for example. For example, the filler 32 may be a butyl tape.

As illustrated in FIGS. 2 and 3, the films 33 are attached to cover the gaps formed at the connection portions between the front frame unit 120 and the side frames 110 and between the rear frame unit 130 and the side frames 110. Each film 33 is desirably made of resin with high water resistance in the same way as the fillers 32. A coefficient of elasticity of the film 33 is desirably greater than a coefficient of elasticity of the filler 32.

As illustrated in FIG. 1, the weather strip 34 is mounted at the inner mounting surface 38 of the sunroof panel 30 to cover the first opening portion 36 of the sunroof panel 30. The weather strip 34 is compressed and deformed between the sunroof panel 30 and the center panel 50 that is at a fully closed position. The weather strip 34 thus restrains raindrops, for example, from entering the interior of the vehicle 10 through a possible clearance between the sunroof panel 30 and the center panel 50.

As illustrated in FIG. 1, the seal 35 in a frame form includes the size substantially the same as the external form of the sunroof panel 30. The seal 35 is made of resin and rubber material including water resistance. The seal 35 firmly connects the outer mounting surface 39 of the sunroof panel 30 and the mounting portion 22 of the vehicle body 20 to each other. The seal 35 is a member filling a possible clearance between the sunroof panel 30 and the mounting portion 22 of the vehicle body 20.

As illustrated in FIG. 1, each of the front panel 40, the center panel 50, and the rear panel 60 includes a substantially rectangular plate configuration in a plan view. The front panel 40 includes the size corresponding to the size of the front frame 140. The center panel 50 includes the size corresponding to the size of the first opening portion 36. The rear panel 60 includes the size corresponding to the size of the second opening portion 37. The center panel 50 and the rear panel 60 are glass panels, for example, through which light penetrates. Each of the front panel 40 and the rear panel 60 serves as a fixed panel that is fixedly arranged. The center panel 50 serves as a movable panel that opens and closes the first opening portion 36 serving as an example of an opening portion via the sunroof device 70.

A manufacturing method of the sunroof panel 30 is explained below. In a case where the sunroof panel 30 is manufactured, the side frames 110, the front frame unit 120, and the rear frame unit 130 are individually and separately formed. Then, the front panel 40 is joined to the front frame unit 120 and the rear panel 60 is joined to the rear frame unit 130. The side frames 110 and the front frame unit 120 are joined to each other by the joining portions 31 in a state where the first connection frames 150 of the front frame unit 120 are placed onto the front end portions of the side frames 110. In addition, the side frames 110 and the rear frame unit 130 are joined to each other by the joining portions 31 in a state where the second connection frames 190 of the rear frame unit 130 are placed onto the rear end portions of the side frames 110.

Figure 4:
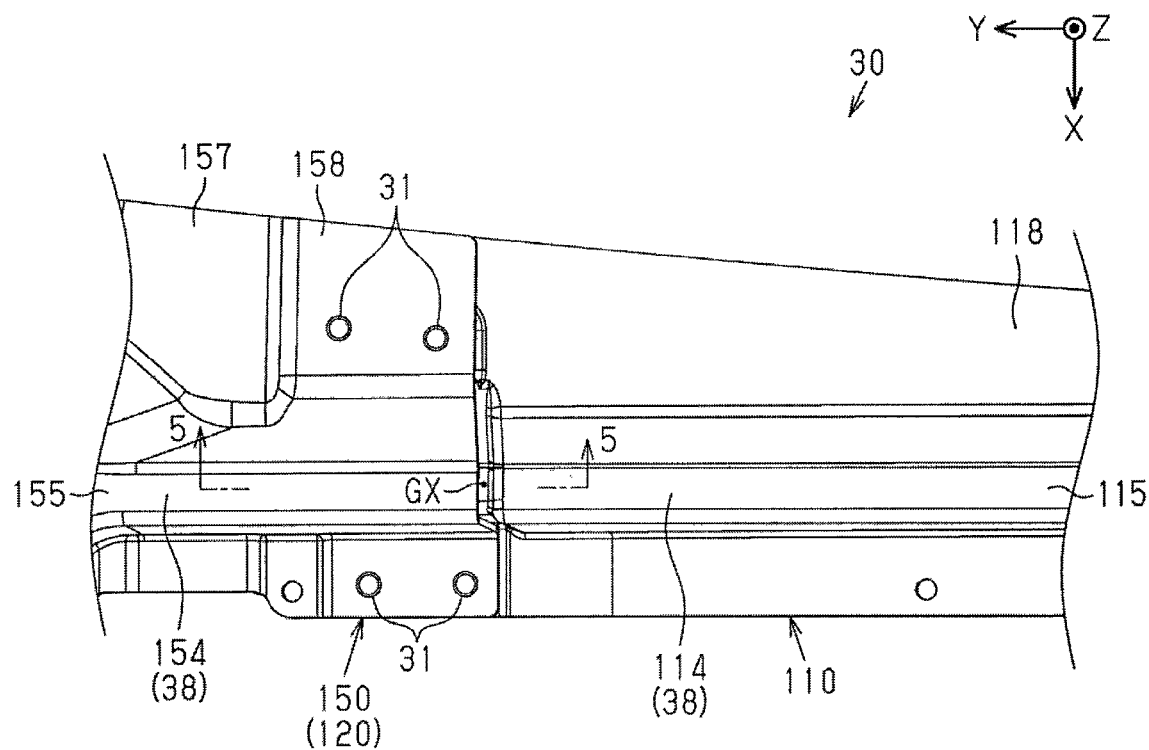
FIG. 4 is a plan view partially illustrating the sunroof panel according to the first embodiment.
Figure 5:
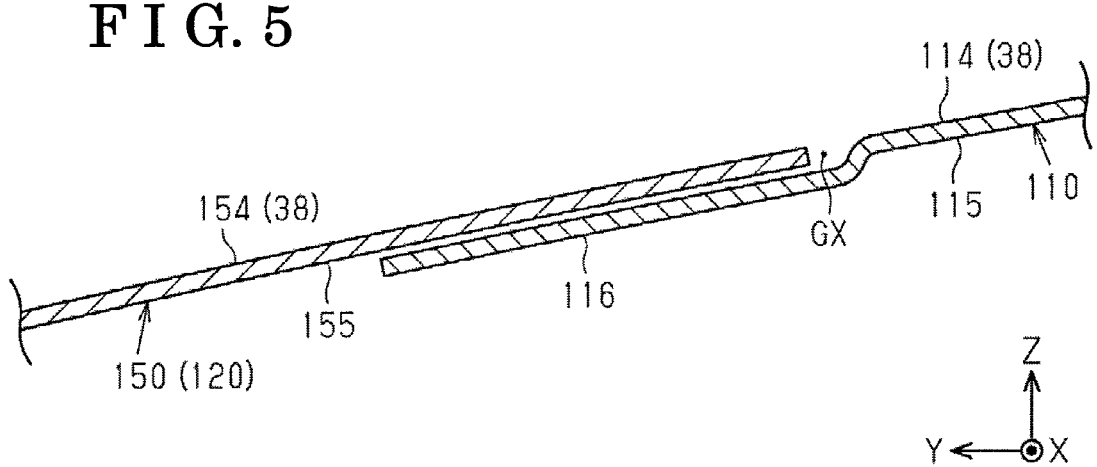
FIG. 5 is a cross-sectional view taken along line 5-5 in FIG. 4.

As illustrated in FIG. 4, the first inner mounting surface 114 of the side frame 110 and the second inner mounting surface 154 of the first connection frame 150 are arranged to be coplanar and adjacent to each other in the vehicle front-rear direction in a state where the side frames 110 and the front frame unit 120 are joined by the joining portions 31. In the aforementioned state, as illustrated in FIGS. 4 and 5, an inner gap GX is formed between the first inner plate 115 of the side frame 110 and the second inner plate 155 of the first connection frame 150 so as to separate the first inner mounting surface 114 and the second inner mounting surface 154 from each other.

Figure 6:
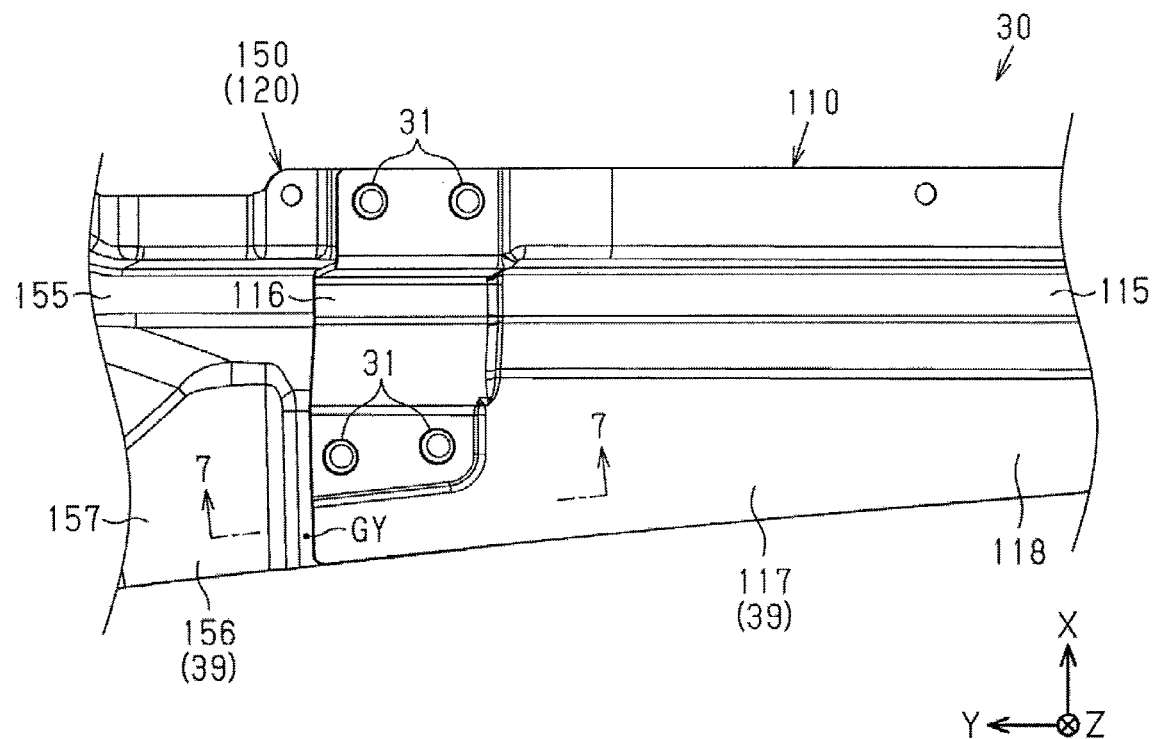
FIG. 6 is a bottom view partially illustrating the sunroof panel according to the first embodiment.
Figure 7:
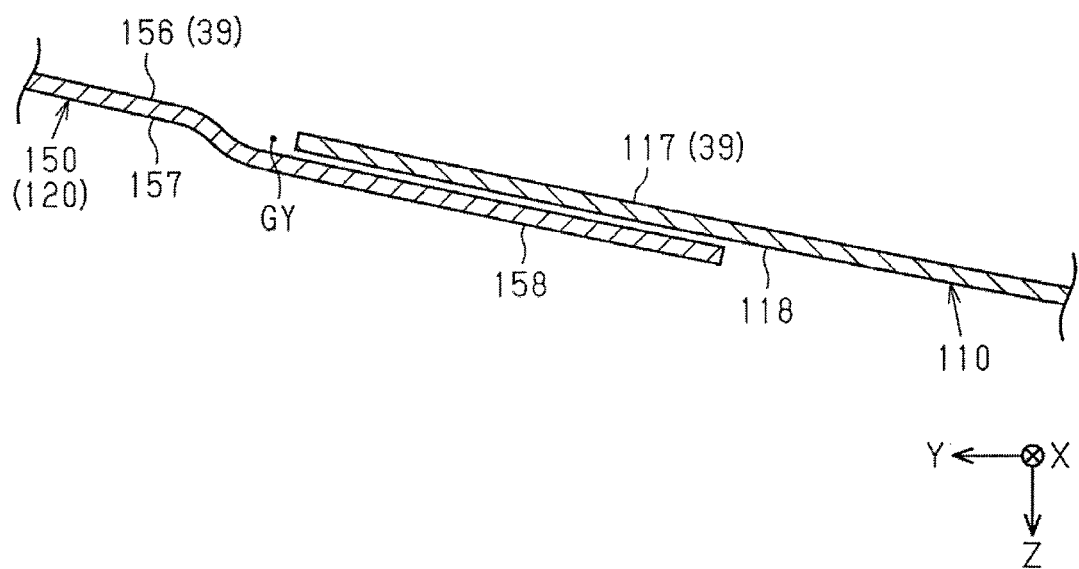
FIG. 7 is a cross-sectional view taken along line 7-7 in FIG. 6.

As illustrated in FIG. 6, the first outer mounting surface 117 of the side frame 110 and the second outer mounting surface 156 of the first connection frame 150 are arranged to be coplanar and adjacent to each other in the vehicle front-rear direction in a state where the side frames 110 and the front frame unit 120 are joined by the joining portions 31. In the aforementioned state, as illustrated in FIGS. 6 and 7, an outer gap GY is formed between the first outer plate 118 of the side frame 110 and the second outer plate 157 of the first connection frame 150 so as to separate the first outer mounting surface 117 and the second outer mounting surface 156 from each other.

Figure 8:
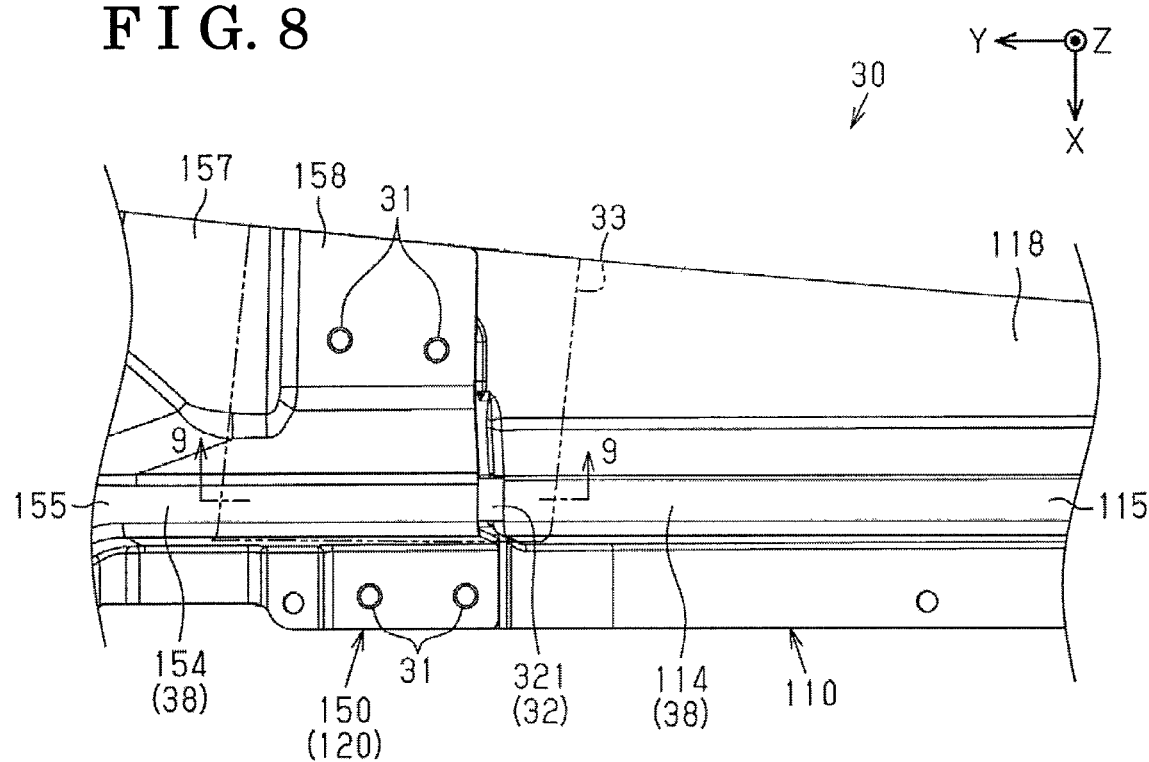
FIG. 8 is a plan view partially illustrating the sunroof panel according to the first embodiment.
Figure 9:
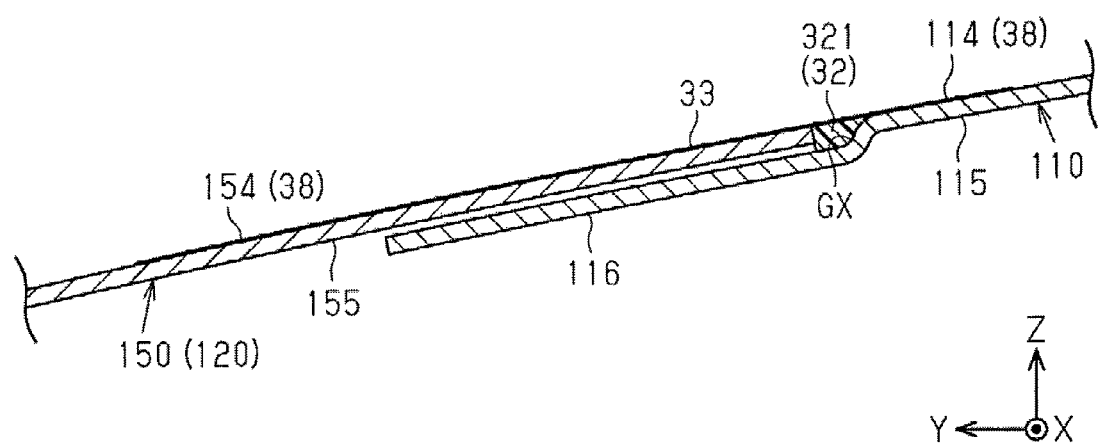
FIG. 9 is a cross-sectional view taken along line 9-9 in FIG. 8.
Figure 10:
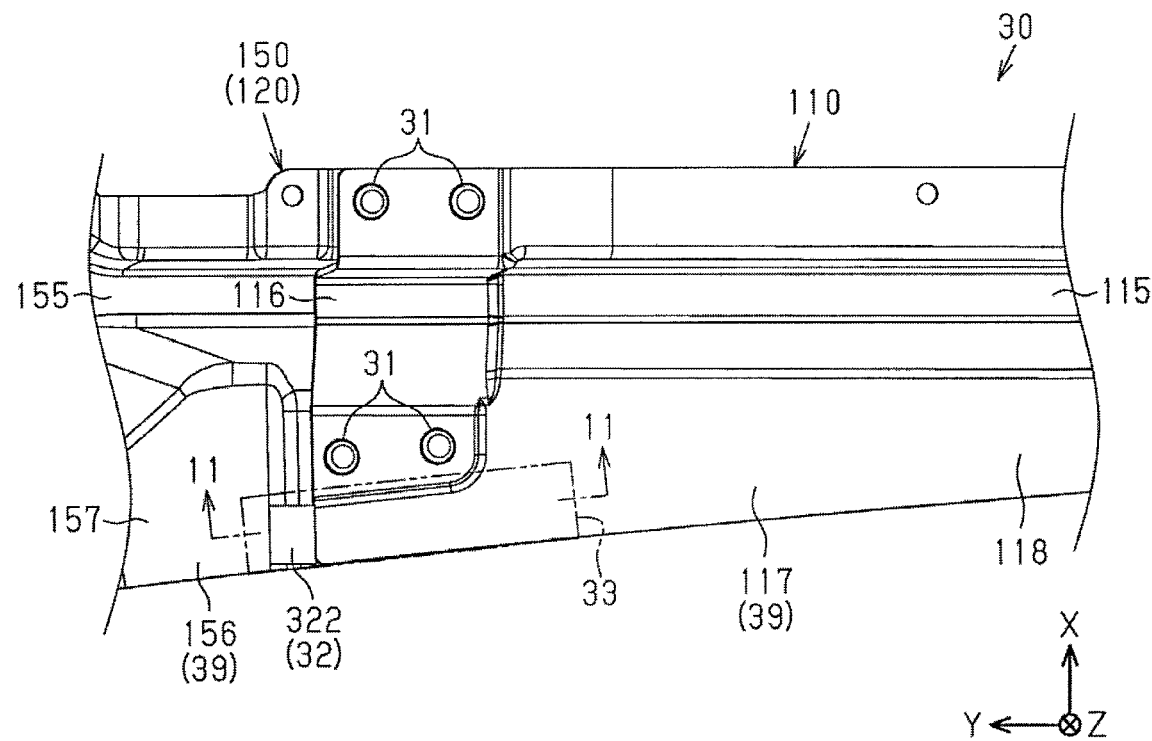
FIG. 10 is a bottom view partially illustrating the sunroof panel according to the first embodiment.
Figure 11:
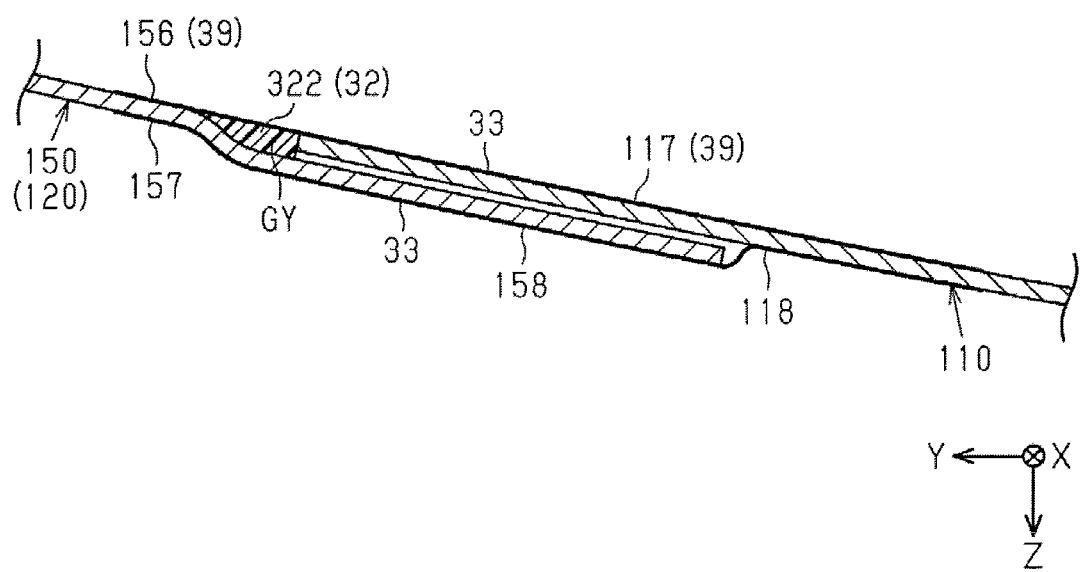
FIG. 11 is a cross-sectional view taken along line 11-11 in FIG. 10.

Then, the fillers 32 are arranged at the inner gap GX and the outer gap GY. Specifically, a first filler 321 is arranged at the inner gap GX as illustrated in FIGS. 8 and 9 and a second filler 322 is arranged at the outer gap GY as illustrated in FIGS. 10 and 11. The first filler 321 is attached to a surface of the first inner stepped plate 116 serving as a bottom surface of the inner gap GX as illustrated in FIG. 9. The second filler 322 is attached to a surface of the second outer stepped plate 158 serving as a bottom surface of the outer gap GY as illustrated in FIG. 11. At this time, the first filler 321 may slightly stick out from a surface connecting the first inner mounting surface 114 and the second inner mounting surface 154. The second filler 322 may also stick out from a surface connecting the first outer mounting surface 117 and the second outer mounting surface 156.

When the inner gap GX and the outer gap GY are filled with the first filler 321 and the second filler 322, the films 33 are respectively attached to cover the first filler 321 and the second filler 322. Specifically, the film 33 (a first film) is attached to the first inner mounting surface 114 and the second inner mounting surface 154 to cover the inner gap GX that is sealed with the first filler 321. The film 33 (a second film) is attached to the first outer mounting surface 117 and the second outer mounting surface 156 to cover the outer gap GY that is sealed with the second filler 322. In a case where the first filler 321 is positioned sticking out from the surface connecting the first inner mounting surface 114 and the second inner mounting surface 154 and the second filler 322 is positioned sticking out from the surface connecting the first outer mounting surface 117 and the second outer mounting surface 156, the films 33 are attached while the first filler 321 and the second filler 322 are being compressed. The first inner mounting surface 114 and the second inner mounting surface 154 are connected in the vehicle front-rear direction by the film 33 (the first film) and also the first outer mounting surface 117 and the second outer mounting surface 156 connected in the vehicle front-rear direction by the film 33 (the second film).

In the embodiment, the film 33 is folded back at an outer edge of the joint (connection) portion between the side frame 110 and the first connection frame 150 in the vehicle width direction as illustrated in FIGS. 8 and 10. That is, the upper surface and the lower surface of the joint (connection) portion between the side frame 110 and the first connection frame 150 are covered by the single film 33.

In the same manner, the first filler 321 and the second filler 322 are arranged at the respective connection (joint) portions between the side frames 110 and the rear frame unit 130 and thereafter the films 33 are attached to the connection (joint) portions.

Figure 12:
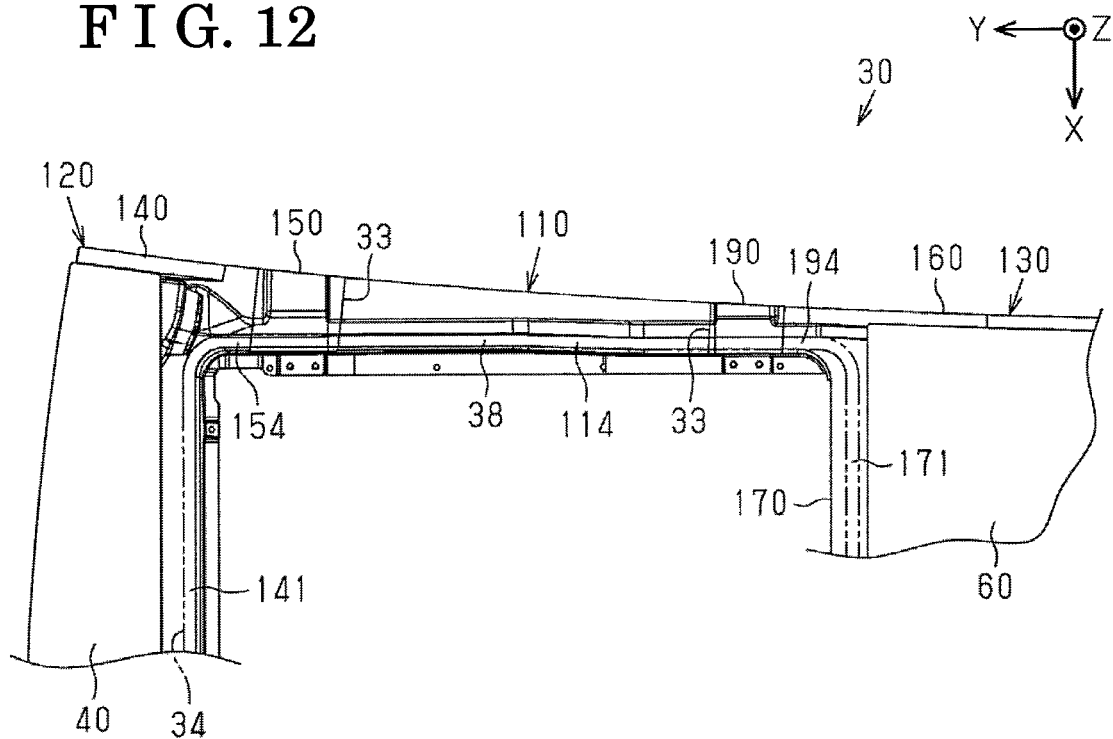
FIG. 12 is a plan view partially illustrating the sunroof panel according to the first embodiment.
Figure 13:
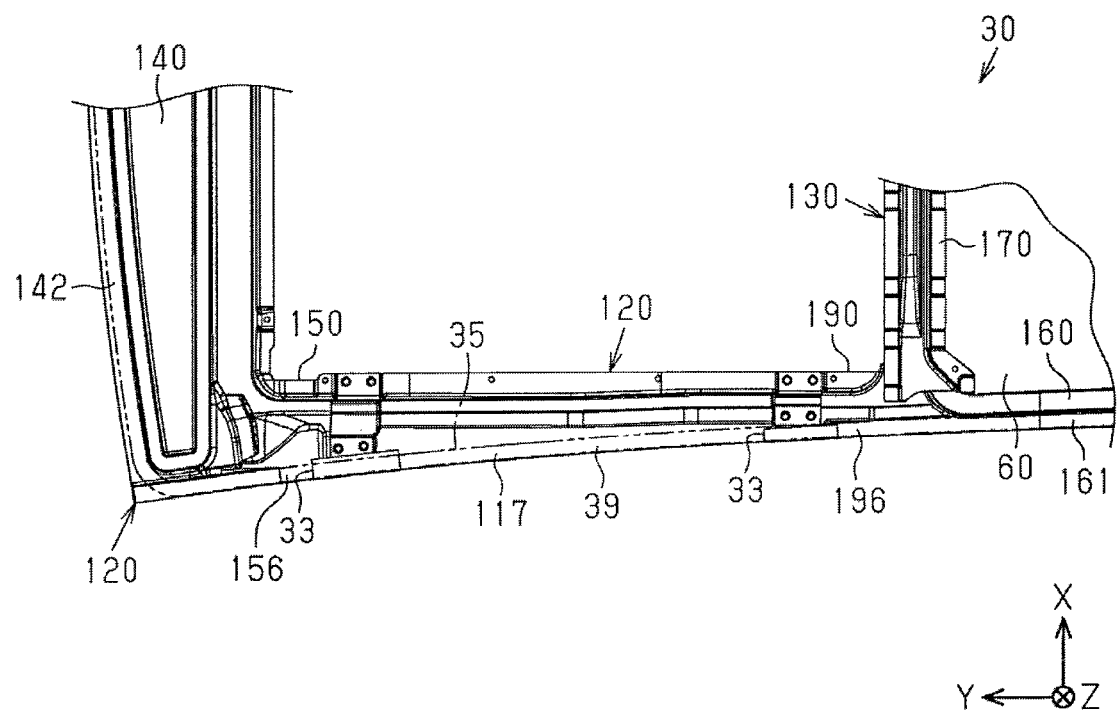
FIG. 13 is a bottom view partially illustrating the sunroof panel according to the first embodiment.

As illustrated in FIG. 12, the weather strip 34 is mounted to the inner mounting surface 38 (the surfaces 114, 141, 154, 171, and 194) that is continuously formed in a circumferential direction to surround the first opening portion 36 of the sunroof panel 30. As illustrated in FIG. 13, the outer mounting surface 39 (the surfaces 117, 142, 156, 161, 196) continuously formed along the outer edge of the sunroof panel 30 is mounted to the mounting portion 22 of the vehicle body 20 via the seal 35. In the first embodiment, the weather strip 34, the seal 35, and the mounting portion 22 of the vehicle body 20 serve as roof elements (a first roof element and a second roof element) constituting a roof for the vehicle 10. The weather strip 34 and the seal 35 may be mounted at the inner mounting surface 38 and the outer mounting surface 39 by adhesive compound such as double-stick tape or adhesive agent with hardening ability, for example.

According to the first embodiment, the sunroof panel 30 is constructed so that the inner gap GX formed between the first inner plate 115 of the side frame 110 and the second inner plate 155 of the first connection frame 150 is sealed or covered by the film 33. Specifically, the film 33 constitutes, together with the first inner mounting surface 114 and the second inner mounting surface 154, a part of the inner mounting surface 38 that is continuously formed and arranged. The weather strip 34 is mounted at the inner mounting surface 38 that is not separated or divided in a peripheral direction. The film 33 is simply attached to the first inner mounting surface 114 and the second inner mounting surface 154 to cover the inner gap GX provided between the first inner plate 115 and the second inner plate 155. The inner gap GX that is formed at a portion where end portions of the two frames overlap each other is thus efficiently sealed and covered. The inner mounting surface 38 formed in the smoothed surface, without step, is obtained in the sunroof panel 30 accordingly.

Such effect is also applicable to the outer gap GY formed between the first outer plate 118 of the side frame 110 and the second outer plate 157 of the first connection frame 150, and to the inner gap GX and the outer gap GY formed at the respective connection portions between the side frame 110 and the second connection frame 190.

The inner gap GX is filled with the first filler 321. Thus, even when an external force is applied to the film 33 in a case where the weather strip 34 is mounted at the inner mounting surface 38, the film 33 may be kept coplanar with the first inner mounting surface 114 and the second inner mounting surface 154. The weather strip 34 is easily mountable to the inner mounting surface 38 accordingly. Such effect is also applicable to the second filler 322 arranged at the outer gap GY.

The fillers 32 are solid parts so as not to require waiting time for hardening after being arranged at the inner gap GX and the outer gap GY. The waiting time during a manufacturing process of the sunroof panel 30 is thus restrained, compared to a case where a sealing material with hardening ability is applied to the inner gap GX and the outer gap GY.

Each filler 32 is an elastic body including elasticity. Even when the first filler 321 is positioned sticking out from the surface connecting the first inner mounting surface 114 and the second inner mounting surface 154 in a case where the first filler 321 is arranged at the inner gap GX, the first filler 321 is compressed by the film 33. The film 33 may be easily attachable to the surface connecting the first inner mounting surface 114 and the second inner mounting surface 154 compared to a case where the first filler 321 is made from a hard material.

Because of being an elastic body including elasticity, the first filler 321 may be easily deformed along the first inner stepped plate 116 that forms the inner gap GX when the first filler 321 is arranged at the inner gap GX. Possibility of foreign matters such as raindrops, for example, entering the vehicle interior through a gap between the first filler 321 and the first inner stepped plate 116 may be thus reduced. The same effect is applicable to the second filler 322 arranged at the outer gap GY.

The sunroof panel 30 includes the inner mounting surface 38 facing upward in the vehicle along the first opening portion 36 and the outer mounting surface 39 facing downward in the vehicle along the outer edge of the sunroof panel 30. The outer mounting surface 39 functions as a mounting surface relative to the vehicle body 20 and the inner mounting surface 38 functions as a mounting surface relative to the weather strip 34.

A sunroof panel for a vehicle (which is hereinafter also referred to as a sunroof panel) according to a second embodiment is explained with reference to the attached drawings. Components common to those according to the first embodiment bear the same reference numerals and explanations thereof are omitted.

As illustrated in FIGS. 14 to 17, a sunroof panel 30A for a vehicle 10 includes the opposed side frames 110, a front frame unit 120A, and the rear frame unit 130. The side frames 110 constitute lateral portions of the sunroof panel 30 opposed in the vehicle width direction. The front frame unit 120A constitutes a front portion of the sunroof panel 30A. The rear frame unit 130 constitutes a rear portion of the sunroof panel 30A. The sunroof panel 30A also includes the front panel 40 covering the front frame unit 120A, the rear panel 60 covering the rear frame unit 130, and a resin layer 200 covering the side frames 110, the front frame unit 120A, and the rear frame unit 130. The sunroof panel 30A further includes the joint portions 31 joining and connecting the side frames 110, the front frame unit 120A, and the rear frame unit 130 to each other, and the weather strip 34 and the seal 35 restraining raindrops, for example, from entering the interior of the vehicle 10.

The sunroof panel 30A according to the second embodiment is constituted by a separate-type base panel at which the front panel 40 and the rear panel 60 each serving as a fixed panel are integrally mounted, the separate-type base panel including plural frames, for example, which are individually formed and are connected to each other.

The first inner mounting surface 114, the second inner mounting surfaces 154, 194, and the third inner mounting surfaces 141, 171 of the first embodiment correspond to a first inner smoothed surface 114A, second inner smoothed surfaces 154A, 194A, a third inner smoothed surface 141A, and a fourth inner smoothed surface 171A of the second embodiment. Additionally, the first outer mounting surface 117, the second outer mounting surfaces 156, 196, the third outer mounting surface 142, and the fourth outer mounting surface 161 of the first embodiment correspond to a first outer smoothed surface 117A, second outer smoothed surfaces 156A, 196A, a third outer smoothed surface 142A, and a fourth outer smoothed surface 161A of the second embodiment. The fourth outer mounting surface of the rear frame 180 of the first embodiment corresponds to a fourth outer smoothed surface 181A of the second embodiment. The mounting surfaces of the first embodiment and the corresponding smoothed surfaces of the second embodiment have the same configurations.

Figure 14:
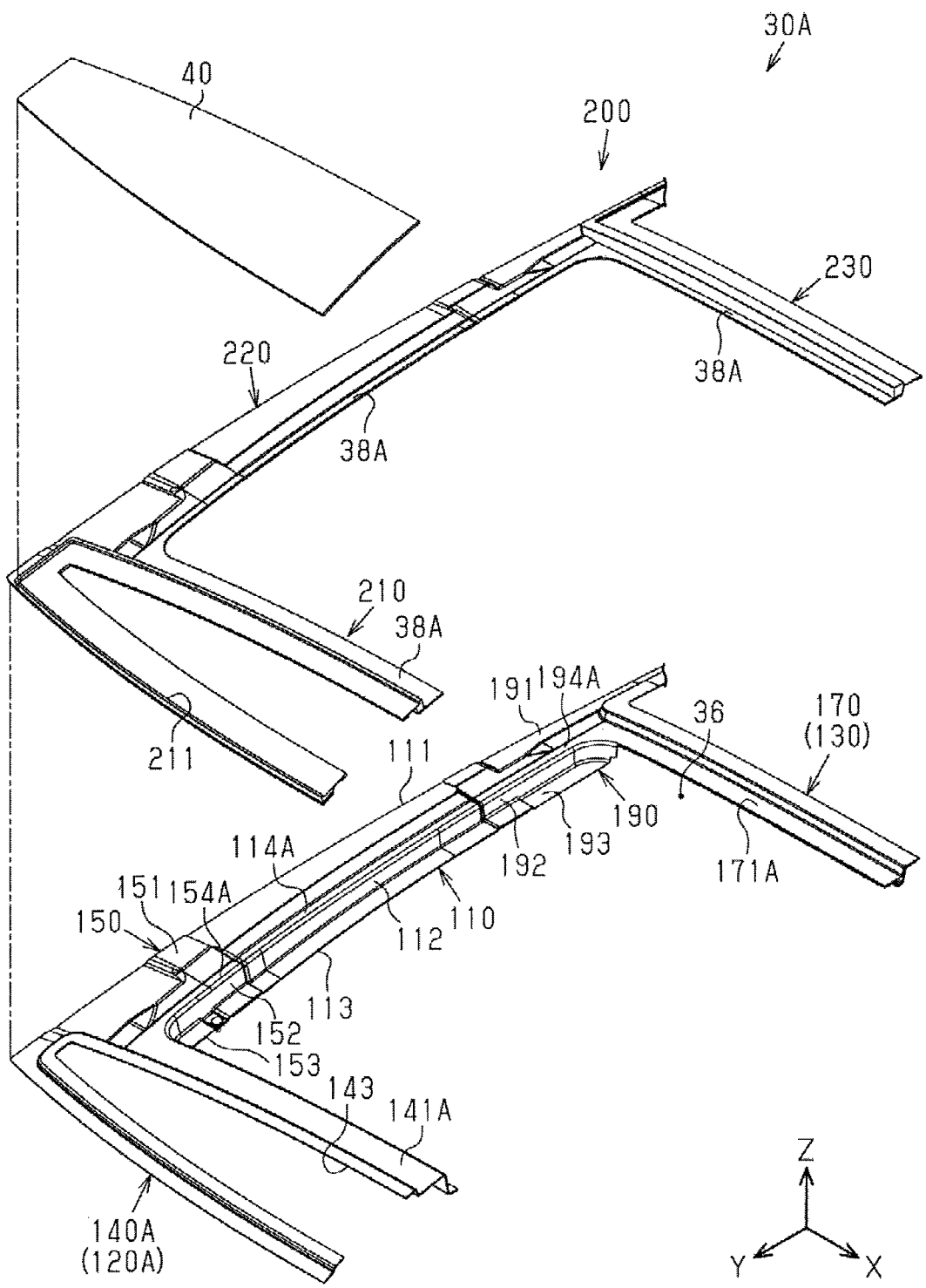
FIG. 14 is an exploded perspective view of a front configuration of a sunroof panel according to a second embodiment as viewed from the upper side of the vehicle.
Figure 15:
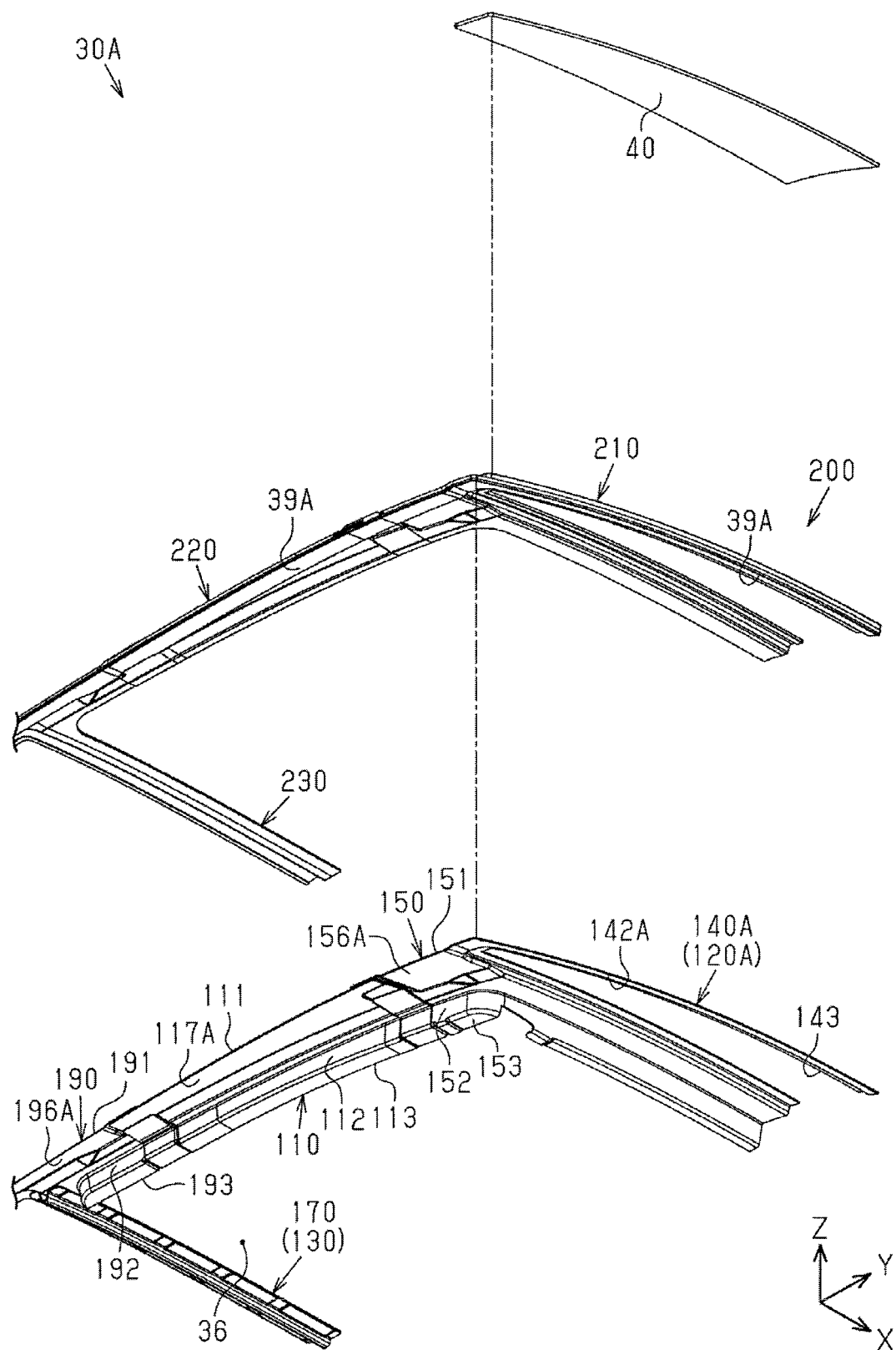
FIG. 15 is an exploded perspective view of the front configuration of the sunroof panel according to the second embodiment as viewed from the lower side of the vehicle.

As illustrated in FIGS. 14 and 15, a pair of side frames 110 extends in the vehicle front-rear direction. The pair of side frames 110 serves as an example of a first frame.

As illustrated in FIGS. 14 and 15, the front frame unit 120A includes a front frame 140A extending in the vehicle width direction and a pair of first connection frames 150. The pair of first connection frames 150 extends rearward in the vehicle from opposed ends of the front frame 140A opposed in the vehicle width direction. The front frame 140A and the first connection frames 150 are integrally formed from a pressed metal sheet, for example.

The front frame 140A is formed in a substantially rectangular plate form including a long side in the vehicle width direction and a short side in the vehicle front-rear direction. The front frame 140A is curved so that a center in the vehicle width direction is positioned upper than the opposed ends as viewed from a front side in the vehicle. The front frame 140A includes a third opening portion 143 that extends in the vehicle width direction. The third opening portion 143 is formed in a substantially rectangular form in a plan view as viewed from the upper side of the vehicle. The third opening portion 143 includes a long side in the vehicle width direction and a short side in the vehicle front-rear direction.

In the second embodiment, the front frame 140A where the third opening portion 143 is provided serves as an example of a main frame. The third opening portion 143 serves as an opening portion. The pair of connection frames 150 extending from the front frame 140A serves as an example of a pair of sub frames and a second frame.

Figure 16:
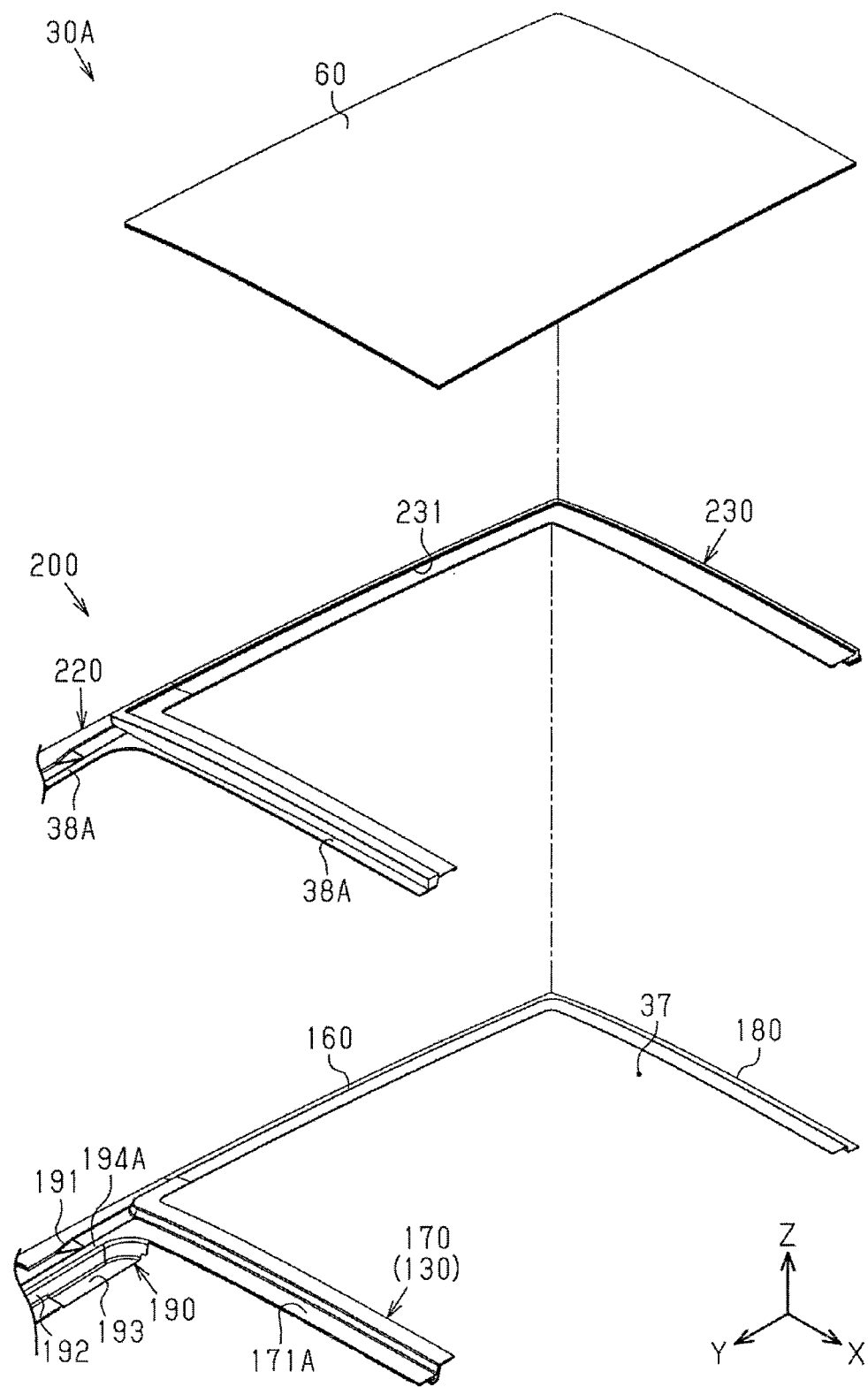
FIG. 16 is an exploded perspective view of a rear configuration of the sunroof panel according to the second embodiment as viewed from the upper side of the vehicle.
Figure 17:
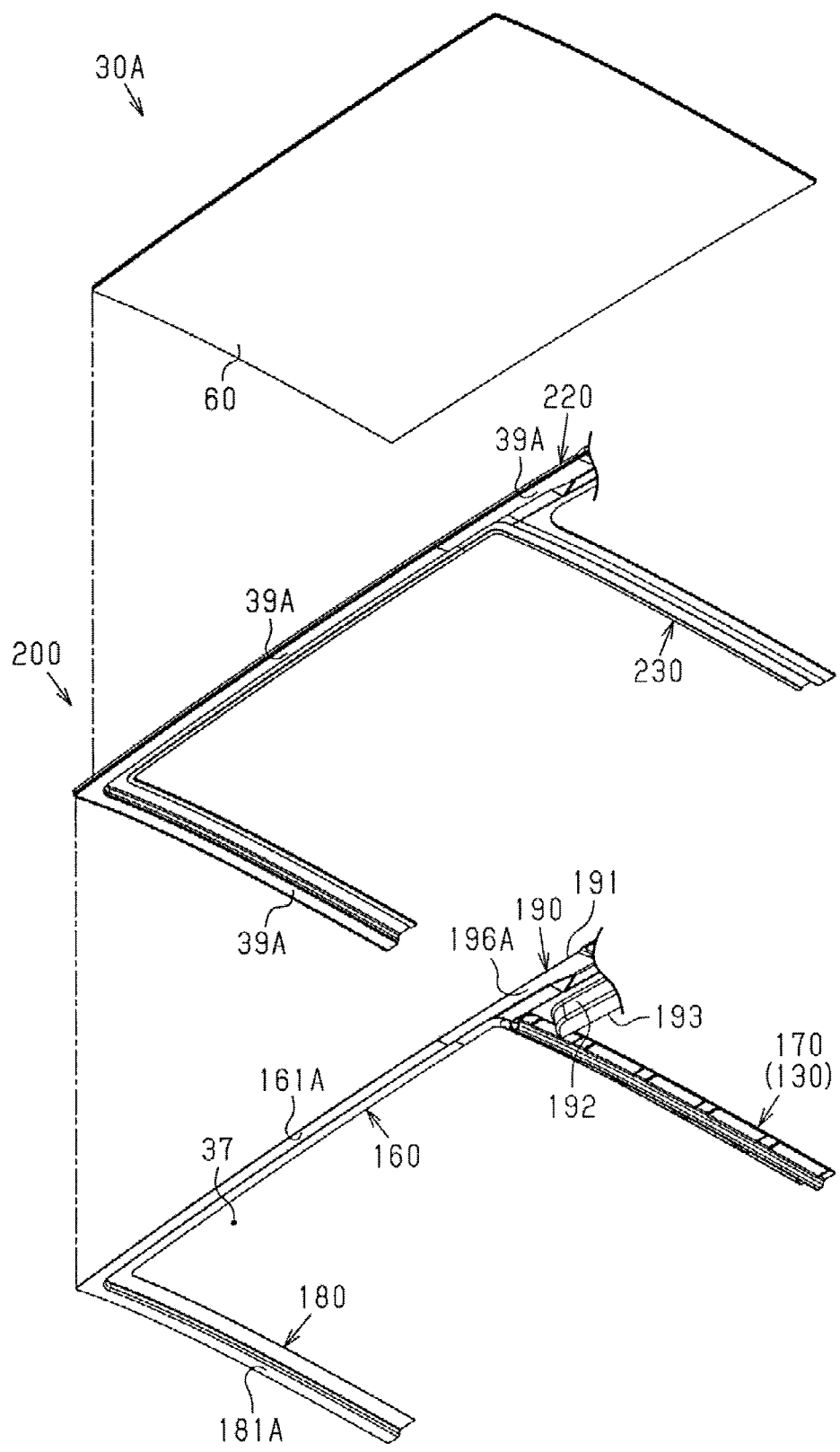
FIG. 17 is an exploded perspective view of the rear configuration of the sunroof panel according to the second embodiment as viewed from the lower side of the vehicle.

As illustrated in FIGS. 16 and 17, the rear frame unit 130 includes a pair of rear side frames 160, a center frame 170, and a rear frame 180. The rear side frames 160 arranged at opposed sides in the vehicle width direction extend in the vehicle front-rear direction. The center frame 170 connects between front end portions of the respective rear side frames 160. The rear frame 180 connects between rear end portions of the respective rear side frames 160. The rear frame unit 130 further includes a pair of second connection frames 190 arranged at opposed sides in the vehicle width direction to extend forward in the vehicle. The second opening portion 37 in the rear frame unit 130 is defined by the rear side frames 160, the center frame 170, and the rear frame 180. That is, the second opening portion 37 is formed at the rear frame unit 130 to extend in the vehicle width direction.

In the second embodiment, the rear frame unit 130 where the second opening portion 37 is provided serves as an example of the main frame. The second opening portion 37 serves as the opening portion. The pair of second connection frames 190 extending from the rear frame unit 130 serves as an example of the pair of sub frames and the second frame.

As illustrated in FIGS. 14 to 17, the resin layer 200 includes a first portion 210, a pair of second portions 220, and a third portion 230. The first portion 210 covers the front frame 140A. The pair of second portions 220 covers the pair of first connection frames 150, the pair of side frames 110, and the pair of second connection frames 190. The third portion 230 covers the rear side frames 160, the center frame 170, and the rear frame 180. The resin layer 200 also includes an inner mounting surface 38A and an outer mounting surface 39A each of which is formed to extend over the first portion 210, the second portions 220, and the third portion 230.

The resin layer 200 is formed by hardening liquid resin injected into a die where the sunroof panel 30A and the front panel 40 are placed. The resin layer 200 is obtainable by typical injection molding. Nevertheless, in view of fluidity of liquid resin within the die, reaction injection molding (RIM) is desirably employed. The first portion 210, the second portions 220, and the third portion 230 are integrally molded at the resin layer 200 accordingly.

Figure 18:
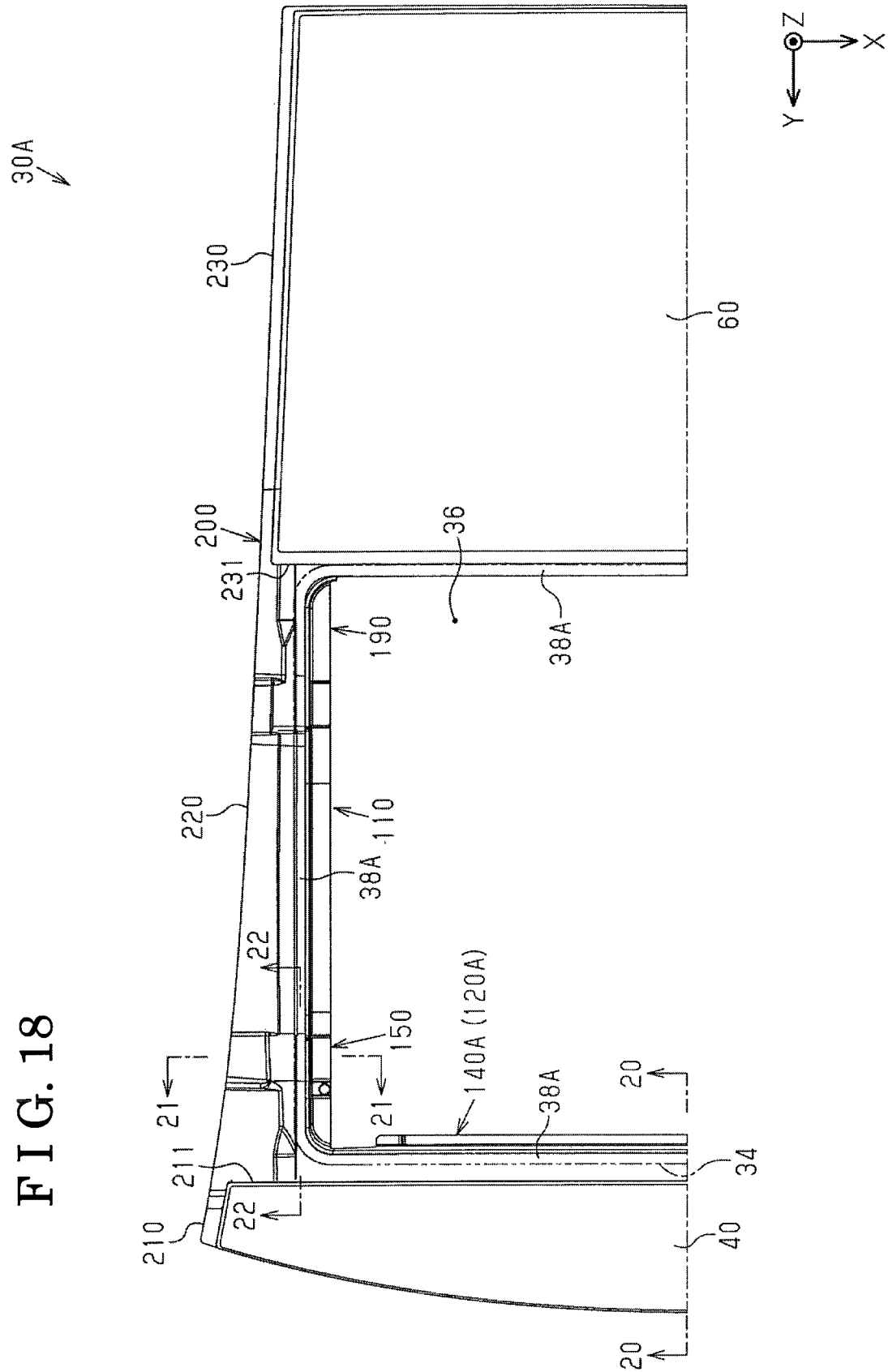
FIG. 18 is a plan view partially illustrating the sunroof panel according to the second embodiment.
Figure 19:
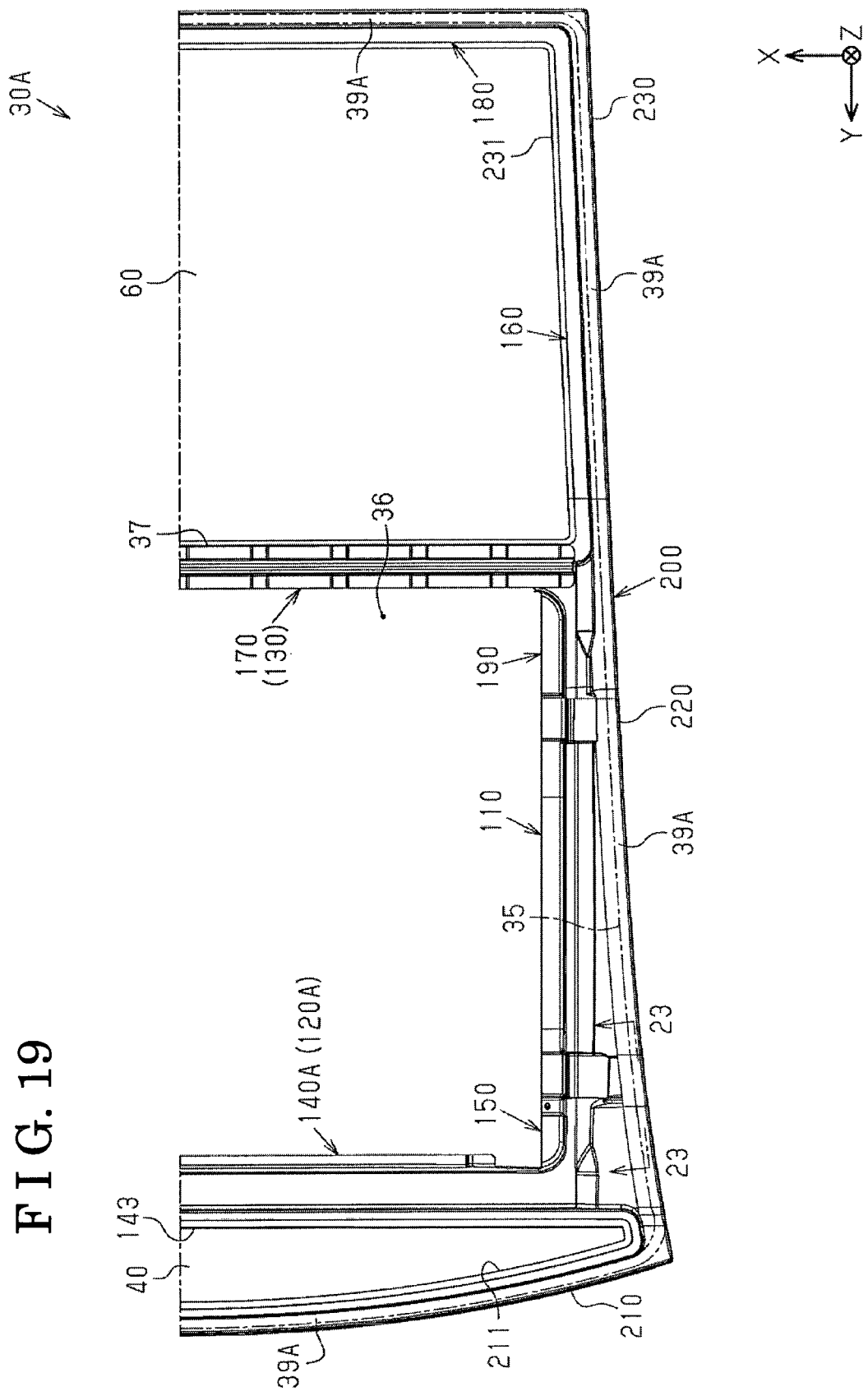
FIG. 19 is a bottom view partially illustrating the sunroof panel according to the second embodiment.

As illustrated in FIG. 14, the first portion 210 includes substantially the same configuration as the front frame 140A in a plan view as viewed from the upper side of the vehicle. As illustrated in FIGS. 14 and 18, the first portion 210 entirely covers an upper surface of the front frame 140A. Specifically, the first portion 210 covers the third inner smoothed surface 141A. As illustrated in FIGS. 15 and 19, the first portion 210 partially covers a lower surface of the front frame 140A. Specifically, the first portion 210 covers the third outer smoothed surface 142A.

Figure 20:
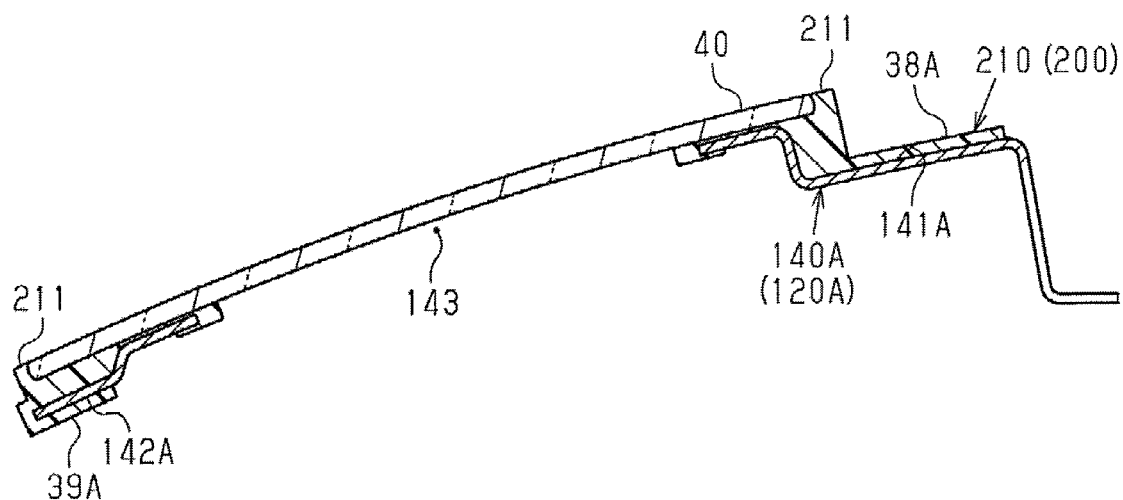
FIG. 20 is a cross-sectional view taken along line 20-20 in FIG. 18.

As illustrated in FIG. 20, the first portion 210 joins the front frame 140A and the front panel 40 so that the front panel 40 covers the third opening portion 143 of the front frame 140A. The first portion 210 desirably includes a protector 211 for protecting an outer edge of the front panel 40. Specifically, the first portion 210 includes a function to cover the front frame 140A, a function to join the front panel 40 and the front frame 140A, and a function to protect the outer edge of the front panel 40. The first portion 210 may entirely cover the front frame 140A.

As illustrated in FIG. 14, each second portion 220 includes substantially the same configuration as the joined frames, i.e., the side frame 110, the first connection frame 150, and the second connection frame 190 joined to each other, in a plan view as viewed from the upper side of the vehicle.

As illustrated in FIGS. 14 and 18, the second portion 220 partially covers upper surfaces of the side frame 110, the first connection frame 150, and the second connection frame 190. Specifically, the second portion 220 covers the first inner smoothed surface 114A of the side frame 110 and the second inner smoothed surface 154A of the first connection frame 150 while spreading or stretching over a joint portion between the side frame 110 and the first connection frame 150. The second portion 220 also covers the first inner smoothed surface 114A of the side frame 110 and the second inner smoothed surface 194A of the second connection frame 190 while spreading over a joint portion between the side frame 110 and the second frame 190.

As illustrated in FIGS. 15 and 19, the second portion 220 partially covers lower surfaces of the side frame 110, the first connection frame 150, and the second connection frame 190. Specifically, the second portion 220 covers the first outer smoothed surface 117A of the side frame 110 and the second outer smoothed surface 156A of the first connection frame 150 while spreading over a joint portion between the side frame 110 and the first connection frame 150. The second portion 220 also covers the first outer smoothed surface 117A of the side frame 110 and the second outer smoothed surface 196A of the second connection frame 190 while spreading over a joint portion between the side frame 110 and the second frame 190.

Figure 21:
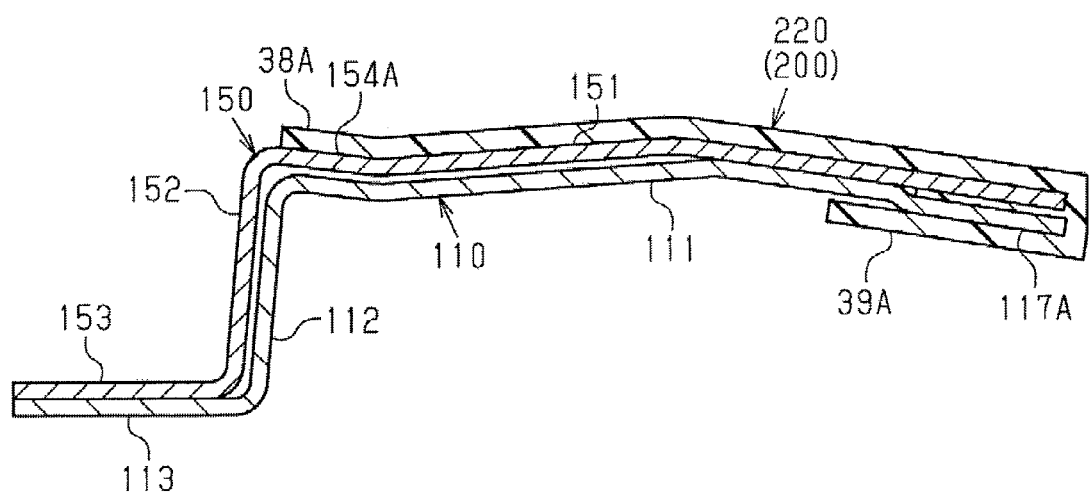
FIG. 21 is a cross-sectional view taken along line 21-21 in FIG. 18.

In a cross-section of the joint portion between the side frame 110 and the first connection frame 150 as illustrated in FIG. 21, the second portion 220 extends outward in the vehicle width direction to cover the upper surface of the first connection frame 150, then extends downward, and further extends inward in the vehicle width direction to cover the lower surface of the side frame 110. Specifically, the second portion 220 extends outward in the vehicle width direction and then returns inward in the vehicle width direction. A gap formed between the side frame 110 and the first connection frame 150 is thus inhibited from being exposed outward in the vehicle width direction. The side frames 110, the first connection frames 150, and the resin layer 200 joined to each other are actually inhibited from being exploded though FIGS. 14 to 17 illustrate exploded configurations.

The above is also applied to the second portion 220 that covers the joint portion between the side frame 110 and the second connection frame 190. The side frame 220 may entirely cover the side frame 110, the first connection frame 150, and the second connection frame 190.

As illustrated in FIG. 16, the third portion 230 includes substantially the same configuration as a part of the rear frame unit 130 excluding the pair of second connection frames 190. As illustrated in FIGS. 16 and 18, the third portion 230 entirely covers upper surfaces of the pair of rear side frames 160, the center frame 170, and the rear frame 180 of the rear frame unit 130. Specifically, the third portion 230 covers the fourth inner smoothed surface 171A. As illustrated in FIGS. 17 and 19, the third portion 230 partially covers lower surfaces of the pair of rear side frames 160 and the rear frame 180. Specifically, the third portion 230 covers the fourth outer smoothed surfaces 161A and 181A.

As illustrated in FIG. 16, the third portion 230 joins the rear frame unit 130 and the rear panel 60 so that the rear panel 60 covers the second opening portion 37 of the rear frame unit 130. The third portion 230 desirably includes a protector 231 for protecting an outer edge of the rear panel 60. Specifically, the third portion 230 includes a function to cover the rear side frames 160, the center frame 170, and the rear frame 180, a function to join the rear frame unit 130 and the rear panel 60, and a function to protect the outer edge of the rear panel 60. The third portion 230 may entirely cover the rear frame unit 130.

As illustrated in FIGS. 18 and 19, the resin layer 200 includes the inner mounting surface 38A serving as a mounting surface for the weather strip 34 and the outer mounting surface 39A serving as a mounting surface for the mounting portion 22 of the vehicle body 20.

As illustrated in FIG. 18, the inner mounting surface 38A is formed in a rectangular frame form greater than the first opening portion 36 in a plan view as viewed from the upper side of the vehicle. The inner mounting surface 38A is formed inward than the outer mounting surface 39A in a plan view as viewed from the upper side of the vehicle.

The inner mounting surface 38A is formed to spread over the joint portions among the side frames 110, the front frame unit 120A, and the rear frame unit 130 while extending in each longitudinal direction thereof in a plan view as viewed from the upper side of the vehicle.

Specifically, the inner mounting surface 38A is formed and arranged upon the third inner smoothed surface 141A of the front frame 140A, the second inner smoothed surfaces 154A of the pair of first connection frames 150, the first inner smoothed surfaces 114A of the pair of side frames 110, the second inner smoothed surfaces 194A of the pair of second connection frames 190, and the fourth inner smoothed surface 171A of the center frame 170. The front frame 140A, the pair of first connection frames 150, the pair of side frames 110, the pair of second connection frames 190, and the center frame 170 thus extend along the inner mounting surface 38A.

Figure 22:
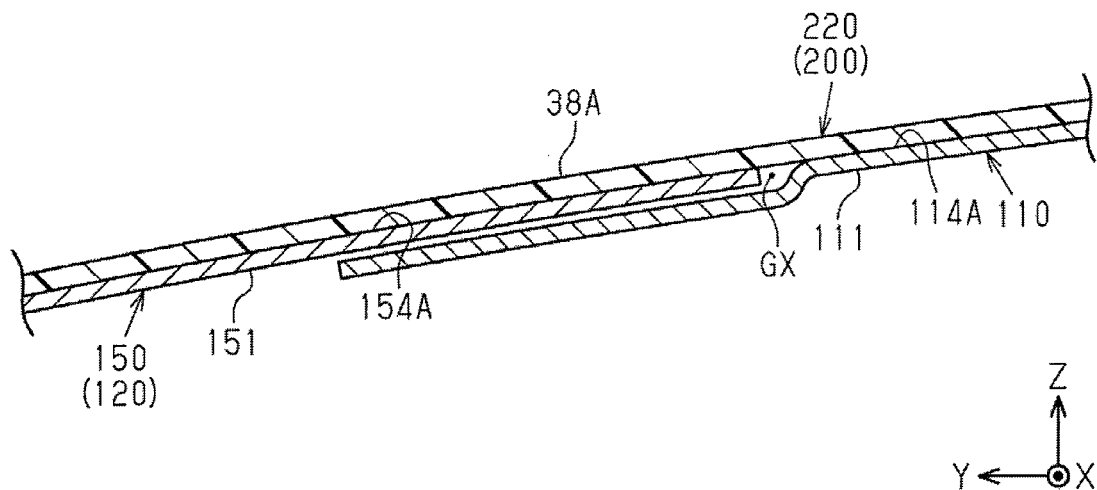
FIG. 22 is a cross-sectional view taken along line 22-22 in FIG. 18.

As illustrated in FIG. 22, the resin layer 200 covers the inner gap GX that separates the first inner smoothed surface 114A of each side frame 110 and the second inner smoothed surface 154A of each first connection frame 150 from each other. The inner mounting surface 38A of the resin layer 200 is formed in a smoothed surface regardless of whether the inner gap GX is formed or not. In FIG. 22, the resin layer 200 is not formed at the inner gap GX but may be disposed or arranged at the inner gap GX. The resin layer 200 also covers the inner gap GX that separates the first inner smoothed surface 114A of the side frame 110 and the second inner smoothed surface 194A of the second connection frame 190 from each other.

As illustrated in FIG. 19, the outer mounting surface 39A is formed in a rectangular frame form smaller than the roof opening portion 21 in a plan view as viewed from the upper side of the vehicle.

The outer mounting surface 39A is formed to spread over the joint portions among the side frames 110, the front frame unit 120A, and the rear frame unit 130 while extending in each longitudinal direction thereof in a plan view as viewed from the lower side of the vehicle.

Specifically, the outer mounting surface 39A is formed and arranged upon the third outer smoothed surface 142A of the front frame 140A, the second outer smoothed surfaces 156A of the pair of first connection frames 150, the first outer smoothed surfaces 117A of the pair of side frames 110, the second outer smoothed surfaces 196A of the pair of second connection frames 190, the fourth outer smoothed surfaces 161A of the pair of rear side frames 160, and the fourth outer smoothed surface 181A of the rear frame 180. The front frame 140A, the pair of first connection frames 150, the pair of side frames 110, the pair of second connection frames 190, the pair of rear side frames 160, and the rear frame 180 thus extend along the outer mounting surface 39A.

Figure 23:
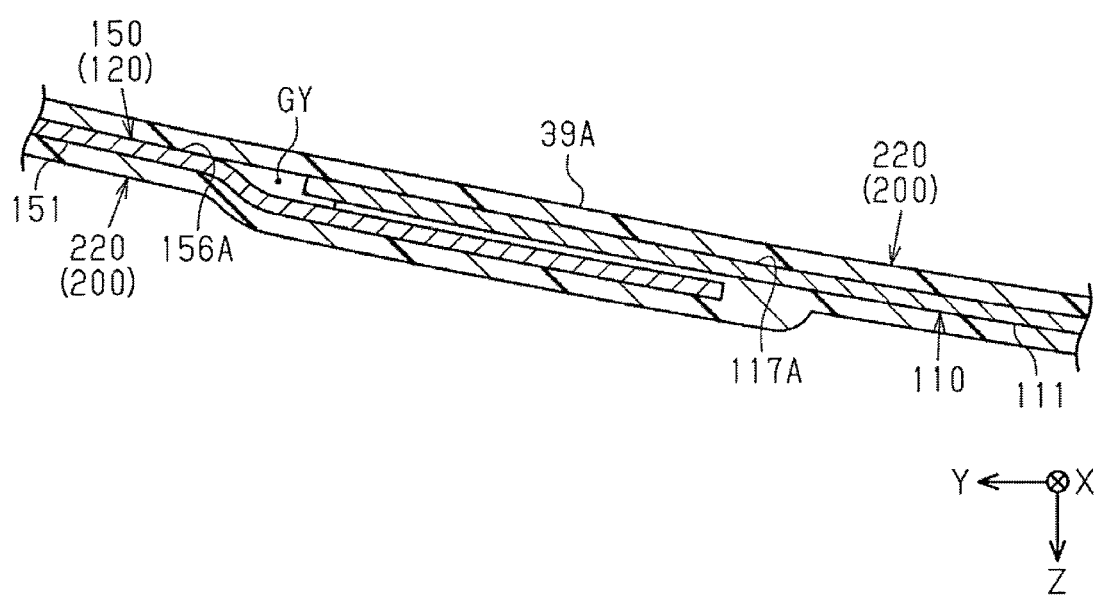
FIG. 23 is a cross-sectional view taken along line 23-23 in FIG. 19.

As illustrated in FIG. 23, the resin layer 200 covers the outer gap GY separating the first outer smoothed surface 117 of the side frame 110 and the second outer smoothed surface 156A of the first connection frame 150 from each other. The outer mounting surface 39A of the resin layer 200 is formed in a smoothed surface regardless of whether the outer gap GY is formed or not. In FIG. 23, the resin layer 200 is not formed at the outer gap GY but may be disposed or arranged at the outer gap GY. The resin layer 200 also covers the outer gap GY that separates the first outer smoothed surface 117A of the side frame 110 and the second outer smoothed surface 196A of the second connection frame 190 from each other.

A manufacturing method of the sunroof panel 30A is explained below. In a case where the sunroof panel 30A is manufactured, the side frames 110, the front frame unit 120A, and the rear frame unit 130 are individually and separately formed. Then, the side frames 110 and the front frame unit 120A are joined to each other by the joining portions 31 in a state where rear end portions of the first connection frames 150 of the front frame unit 120A are placed from the upper side of the vehicle onto front end portions of the side frames 110. Additionally, the side frames 110 and the rear frame unit 130 are joined to each other by the joining portions 31 in a state where front end portions of the second connection frames 190 of the rear frame unit 130 are placed from the upper side of the vehicle onto rear end portions of the side frames 110.

Next, RIM is performed in a state where the side frames 110, the front frame unit 120A, the rear frame unit 130, the front panel 40, and the rear panel 60 which are joined to each other are arranged within a die. Specifically, the side frames 110, the front frame unit 120A, and the rear frame unit 130 are covered or coated with the resin layer 200 and the front panel 40 and the rear panel 60 are joined to the front frame unit 120A and the rear frame unit 130 respectively. The inner mounting surface 38A and the outer mounting surface 39A each formed in a smoothed surface is obtained.

The weather strip 34 is mounted to the inner mounting surface 38A that is continuously formed in a circumferential direction to surround the first opening portion 36 of the sunroof panel 30. In addition, the outer mounting surface 39 continuously formed along the outer edge of the sunroof panel 30A is mounted to the mounting portion 22 of the vehicle body 20 via the seal 35.

In the second embodiment, the weather strip 34, the seal 35, and the mounting portion 22 of the vehicle body 20 serve as roof elements constituting a roof for the vehicle 10. The weather strip 34 and the seal 35 may be mounted at the inner mounting surface 38A and the outer mounting surface 39A by adhesive compound such as double-stick tape or adhesive agent with hardening ability, for example.

According to the second embodiment, the sunroof panel 30A includes the resin layer 200 that covers the front frame 140A, the side frames 110, the first connection frames 150, the second connection frames 190, and the center frame 170 while including the joint portions between the side frames 110 and the first connection frames 150 and the joint portions between the side frames 110 and the second connection frames 190. The resin layer 200 includes the inner mounting surface 38A at which the weather strip 34 is mounted and the outer mounting surface 39A at which the mounting portion 22 of the vehicle body 20 is mounted via the seal 35A. Thus, the inner mounting surface 38A and the outer mounting surface 39A are each formed in a smoothed surface with each inner gap GX formed at the joint portion between the first connection frame 150 and the side frame 110 and each outer gap GY formed at the joint portion between the side frame 110 and the second connection frame 190.

The resin layer 200 is provided not only to form the inner mounting surface 38A and the outer mounting surface 39A but also to join the front panel 40 to the front frame unit 120A and to join the rear panel 60 to the rear frame unit 130. The sunroof panel 30A may be easily manufactured as compared to a case where the front panel 40 and the rear panel 60 are joined by adhesive agent, for example.

The resin layer 200 covers the outer edge of the front panel 40 and the outer edge of the rear panel 60. The sunroof panel 30A thus obtains the protectors 211 and 231 for protecting the front panel 40 and the rear panel 60 at the same time the resin layer 200 is formed.

The embodiments may be appropriately changed or modified. Modified examples described below and the aforementioned embodiments may be appropriately combined to each other. The sunroof panel 30, 30A may include one of the inner mounting surface 38, 38A and the outer mounting surface 39, 39A. In this case, the components related to the other of the inner mounting surface 38, 38A and the outer mounting surface 39, 39A may be omitted.

In the first embodiment, the sunroof panel 30 may not include the first filler 321 or the second filler 322. In this case, the films 33 may desirably include certain elasticity so as not to be displaced towards the inner gap GX and the outer gap GY in a case where the roof elements are attached to the inner mounting surface 38 and the outer mounting surface 39.

In the first embodiment, the filler 32 may be a hard filler made of metal or resin. In the second embodiment, the resin layer 200 may not join the front panel 40 to the front frame unit 120A or join the rear panel 60 to the rear frame unit 130. That is, the resin layer 200 at least includes the inner mounting surface 38A and the outer mounting surface 39A.

The inner mounting surface 38, 38A may face downward and the outer mounting surface 39, 39A may face upward in the vehicle. In a case where the center frame 170 is construed by joining two frames that are divided in the vehicle width direction, such two frames may be regarded as the first frame and the second frame. Specifically, the first frame and the second frame are not necessarily joined in the vehicle front-rear direction.

According to the first embodiment, a sunroof panel 30 for a vehicle includes a mounting surface 38 at which a first roof element constituting a roof for a vehicle 10 is mounted, a first frame 110 including a first plate 115 that includes a first mounting surface 114 constituting a part of the mounting surface 38, the first frame 110 including a first stepped plate 116 that extends from a longitudinal end portion of the first plate 115 to generate a step relative to the first plate 115, a second frame 150 including a second plate 155 that includes a second mounting surface 154 constituting a part of the mounting surface 38, a joining portion 31 joining the first frame 110 and the second frame 150 in a state where the first stepped plate 116 and an end portion of the second plate 155 overlap each other to cause the first mounting surface 114 and the second mounting surface 154 to be coplanar with each other, and a film 33 attached to the first mounting surface 114 and the second mounting surface 154 to cover a gap GX formed between the first plate 115 and the second plate 155, the gap GX separating the first mounting surface 114 and the second mounting surface 154 from each other.

According to the aforementioned sunroof panel 30, the gap GX formed between the first plate 115 and the second plate 155 is covered by the film 33 attached to the first mounting surface 114 and the second mounting surface 154. That is, the film 33 constitutes, together with the first mounting surface 114 and the second mounting surface 154, the mounting surface 38 where the first roof element of the vehicle 10 such as a weather strip, for example, is mounted. The gap GX formed between the first plate 115 and the second plate 155 is effectively sealed and covered. The mounting surface 38, 39 at which the roof element is mounted is formed in a smoothed surface accordingly.

The sunroof panel 30 further includes a filler 32 serving as a solid part and arranged at the gap GX, GY formed between the first plate 115 and the second plate 155.

According to the aforementioned sunroof panel 30, the gap GX formed between the first plate 115 and the second plate 155 is filled with the filler 32. In a case where an external force is applied to the film 33 when the first roof element is mounted to the mounting surface 38, the surface of the film 33 may be kept coplanar with the first mounting surface 114 and the second mounting surface 154. The roof element is easily mountable at the mounting surface 38 of the roof element accordingly.

The sunroof panel 30 further includes an opening portion 36 opened and closed by a movable panel 50 of the vehicle 10, an inner mounting surface 38 serving as the mounting surface and arranged surrounding the opening portion 36, and an outer mounting surface 39 arranged surrounding the inner mounting surface 38, the outer mounting surface 39 to which a second roof element is mounted. In a state where the first plate serves as a first inner plate 115, the first stepped plate serving as a first inner stepped plate 116, the second plate serving as a second inner plate 155, the first mounting surface serving as a first inner mounting surface 114, the second mounting surface serving as a second inner mounting surface 154, the gap serving as an inner gap GX formed between the first inner plate 115 and the second inner plate 155, the first frame 110 includes a first outer plate 118 including a first outer mounting surface 117 that constitutes a part of the outer mounting surface 39. The second frame 150 includes a second outer plate 157 including a second outer mounting surface 156 that constitutes a part of the outer mounting surface 39, the second frame 150 including a second outer stepped plate 158 that extends from a longitudinal end portion of the second outer plate 157 to generate a step relative to the second outer plate 157. The joining portion 31 joins the first frame 110 and the second frame 150 in a state where an end portion of the first outer plate 118 and the second outer stepped plate 158 overlap each other to cause the first outer mounting surface 117 and the second outer mounting surface 156 to be coplanar with each other. The film 33 is attached to the first inner mounting surface 114, the second inner mounting surface 154, the first outer mounting surface 117, and the second outer mounting surface 156 to cover the inner gap GX and an outer gap GY that is formed between the first outer plate 118 and the second outer plate 157 to separate the first outer mounting surface 117 and the second outer mounting surface 156 from each other. One of the inner mounting surface 38 and the outer mounting surface 39 faces upward and the other of the inner mounting surface (38) and the outer mounting surface 39 faces downward in the vehicle 10.

According to the aforementioned sunroof panel 30, the first roof element is mountable to one of the outer mounting surface 39 and the inner mounting surface 38 from an upper side in the vehicle 10 while the second roof element is mountable to the other of the outer mounting surface 39 and the inner mounting surface 38 from a lower side in the vehicle 10. Thus, the outer mounting surface 39 serves as a mounting surface for a vehicle body 20 and the inner mounting surface 38 serves as a mounting surface for a weather strip 34, for example.

According to the second embodiment, a sunroof panel 30A for a vehicle includes a mounting surface 38A, 39A at which a roof element constituting a roof for a vehicle 10 is mounted, a first frame 110 and a second frame 150, 190 extending along the mounting surface 38A, 39A, a joining portion 31 joining the first frame 110 and the second frame 150, 190 in a state where end portions of the first frame 110 and the second frame 150, 190 overlap each other, and a resin layer 200 covering at least a part of the first frame 110 and at least a part of the second frame 150, 190. The resin layer 200 includes the mounting surface 38A, 39A that extends in a longitudinal direction of the first frame 110 and the second frame 150, 190 while spreading over a joint portion between the first frame 110 and the second frame 150, 190.

In a case where the first frame (the pair of side frames) 110 and the second frame (the pair of first connection frames and the pair of second connection frames) 150, 190 are joined to each other in a state where the end portions of the first frame 110 and the second frame 150, 190 overlap each other, a gap may be generated at the joint portion of the first frame 110 and the second frame 150, 190. Nevertheless, according to the present sunroof apparatus 30A, the resin layer 200 covering the first frame 110 and the second frame 150, 190 includes the mounting surface 38A, 39A that extends in the longitudinal direction of the first frame 110 and the second frame 150, 190 while spreading over the joint portion between the first frame 110 and the second frame 150. 190. Thus, even when the gap is generated at the joint portion between the first frame 110 and the second frame 150, 190, the mounting surface 38A, 39A at which the roof element is mounted serves as a smoothed surface.

The sunroof panel 30A further includes a main frame 130, 140A extending in a width direction for the vehicle, the main frame 130, 140A at which an opening portion 37, 143 is provided to extend in the vehicle width direction, and a fixed panel 40, 60 covering the opening portion 37, 143 of the main frame 130, 140A. The first frame includes a pair of side frames 110 extending in a front-rear direction for the vehicle. The second frame includes a pair of sub frames 150, 190 extending in the front-rear direction from opposed end portions of the main frame 130, 140A opposed in the width direction, the pair of sub frames 150, 190 being connected to the pair of side frames 110 by the joining portion 31. The mounting surface 38A, 39A extends in a longitudinal direction of each of the main frame 130, 140A, the pair of sub frames 150, 190, and the pair of side frames 110 while spreading over joint portions between the pair of sub frames 150, 190 and the pair of side frames 110. The resin layer 200 joins the fixed panel 40, 60 to the main frame 130, 140A.

The resin layer 200 not only constitutes the mounting surface 38A, 39A at which the roof element is mounted but also joins the fixed panel (the front panel, the rear panel) 40, 60 to the main frame (the rear frame unit, the front frame) 130, 140A. As compared to a case where the fixed panel is adhered to the main frame by adhesive agent, for example, the sunroof panel 300 may be easily manufactured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof panel for a vehicle, the sunroof panel comprising:
   a mounting surface at which a first roof element constituting a roof for a vehicle is mounted;
   a first frame including a first plate that includes a first mounting surface constituting a part of the mounting surface, the first frame including a first stepped plate that extends from a longitudinal end portion of the first plate to generate a step relative to the first plate;
   a second frame including a second plate that includes a second mounting surface constituting a part of the mounting surface;
   a joining portion joining the first frame and the second frame in a state where the first stepped plate and an end portion of the second plate overlap each other to cause the first mounting surface and the second mounting surface to be coplanar with each other; and
   a film attached to the first mounting surface and the second mounting surface to cover a gap formed between the first plate and the second plate, the gap separating the first mounting surface and the second mounting surface from each other,
      wherein the film defines a smoothed surface covering the gap formed between the first plate and the second plate, and
   wherein the film comprises a sheet of material attached to the first mounting surface and the second mounting surface.

2. The sunroof panel according to claim 1, further comprising a filler serving as a solid part and arranged at the gap formed between the first plate and the second plate.

3. The sunroof panel according to claim 1, further comprising:
   an opening portion opened and closed by a movable panel of the vehicle;
   an inner mounting surface serving as the mounting surface and arranged surrounding the opening portion; and
   an outer mounting surface arranged surrounding the inner mounting surface, the outer mounting surface to which a second roof element is mounted; wherein
   in a state where the first plate serves as a first inner plate, the first stepped plate serving as a first inner stepped plate, the second plate serving as a second inner plate, the first mounting surface serving as a first inner mounting surface, the second mounting surface serving as a second inner mounting surface, the gap serving as an inner gap formed between the first inner plate and the second inner plate, the first frame includes a first outer plate including a first outer mounting surface that constitutes a part of the outer mounting surface, the second frame includes a second outer plate including a second outer mounting surface that constitutes a part of the outer mounting surface, the second frame including a second outer stepped plate that extends from a longitudinal end portion of the second outer plate to generate a step relative to the second outer plate, the joining portion joins the first frame and the second frame in a state where an end portion of the first outer plate and the second outer stepped plate overlap each other to cause the first outer mounting surface and the second outer mounting surface to be coplanar with each other, the film is attached to the first inner mounting surface, the second inner mounting surface, the first outer mounting surface, and the second outer mounting surface to cover the inner gap and an outer gap that is formed between the first outer plate and the second outer plate to separate the first outer mounting surface and the second outer mounting surface from each other, one of the inner mounting surface and the outer mounting surface faces upward and the other of the inner mounting surface and the outer mounting surface faces downward in the vehicle.

4. The sunroof panel according to claim 1, wherein the sheet of material is folded back at an edge of a joint portion defined by the first frame and the second frame, and wherein one end portion of the sheet of material is attached to an upper surface of the joint portion, and an opposite end portion of the sheet material is attached to a lower surface of the joint portion.

* * * * *